(12) United States Patent
Valverde

(10) Patent No.: US 11,925,527 B2
(45) Date of Patent: Mar. 12, 2024

(54) DENTAL IMPLANT DEVICE AND TECHNIQUE

(71) Applicant: Carlos M. Valverde, Arlington, WA (US)

(72) Inventor: Carlos M. Valverde, Arlington, WA (US)

( * ) Notice: Subject to any disclaimer, the term of this patent is extended or adjusted under 35 U.S.C. 154(b) by 236 days.

(21) Appl. No.: 16/129,602

(22) Filed: Sep. 12, 2018

(65) Prior Publication Data

US 2019/0076221 A1    Mar. 14, 2019

Related U.S. Application Data

(60) Provisional application No. 62/557,611, filed on Sep. 12, 2017.

(51) Int. Cl.
*A61C 8/00*    (2006.01)
*A61C 8/02*    (2006.01)

(52) U.S. Cl.
CPC .......... *A61C 8/0075* (2013.01); *A61C 8/0006* (2013.01); *A61C 8/0009* (2013.01); *A61C 8/0027* (2013.01); *A61C 8/0043* (2013.01); *A61C 8/0051* (2013.01); *A61C 8/0057* (2013.01); *A61C 8/0062* (2013.01); *A61C 8/0068* (2013.01); *A61C 8/0074* (2013.01); *A61C 8/0086* (2013.01); *A61C 8/0022* (2013.01); *A61C 8/0066* (2013.01)

(58) Field of Classification Search
CPC ... A61C 8/0006; A61C 8/0075; A61C 8/0009; A61C 8/0027; A61C 8/0043; A61C 8/0051; A61C 8/0057; A61C 8/0062; A61C 8/0068; A61C 8/0074; A61C 8/0086; A61C 8/0022; A61C 8/0066; A61C 8/0053
See application file for complete search history.

(56) References Cited

U.S. PATENT DOCUMENTS

| | | |
|---|---|---|
| 5,302,127 A | 4/1994 | Cridio, Jr. |
| 5,437,551 A * | 8/1995 | Chalifoux ............ A61C 8/0018 433/172 |
| 5,683,459 A * | 11/1997 | Brekke .................... A61F 2/28 424/423 |

(Continued)

FOREIGN PATENT DOCUMENTS

| | | | | |
|---|---|---|---|---|
| KR | 20150032977 A | * | 4/2015 | |
| WO | WO-2014025081 A1 | * | 2/2014 | ........... A61C 8/0057 |

*Primary Examiner* — Jacqueline T Johanas
*Assistant Examiner* — Shannel Nicole Belk

(57) ABSTRACT

A device for the replacement of missing bone and inadequate bone level, the device comprising: one or more implant blocks, shaped to fill in gaps in a jaw bone, the one or more implant blocks comprised of one or more layers characterized by a honeycomb-like structure, and one or more apertures separated by one or more raised crests; one or more screws; one or more tooth implants, the tooth implants shaped to fit in the one or more apertures of the one or more implant blocks, and having one or more internal holes in their base; one or more tooth abutments, the one or more tooth abutments including one or more members on a side complementary to the shape of the one or more internal holes of the one or more tooth implants, and a support structure; and one or more crowns, the one or more crowns shaped to fit over the support structure of the one or more tooth abutments.

14 Claims, 9 Drawing Sheets

(56) References Cited

U.S. PATENT DOCUMENTS

| | | | | |
|---|---|---|---|---|
| 6,214,049 B1* | 4/2001 | Gayer | .................. | A61C 8/0006 |
| | | | | 623/16.11 |
| 2002/0055698 A1* | 5/2002 | Ashman | ............... | A61C 8/0006 |
| | | | | 602/41 |
| 2008/0274440 A1* | 11/2008 | Smith | ..................... | A61K 6/84 |
| | | | | 433/201.1 |
| 2010/0145393 A1* | 6/2010 | Fallin | ................. | A61C 8/0012 |
| | | | | 606/301 |
| 2012/0077149 A1* | 3/2012 | Ospelt | .................... | A61C 8/005 |
| | | | | 433/173 |
| 2014/0023992 A1* | 1/2014 | Willis | .................. | A61C 8/0022 |
| | | | | 433/174 |
| 2014/0302460 A1* | 10/2014 | Cramer Von Clausbruch ............ | | |
| | | | | A61C 13/083 |
| | | | | 433/201.1 |
| 2015/0305835 A1* | 10/2015 | Debold | .................... | A61C 3/02 |
| | | | | 433/173 |
| 2016/0128834 A1* | 5/2016 | Yakir | .................. | A61C 8/0018 |
| | | | | 433/174 |
| 2017/0014210 A1* | 1/2017 | Rogers | ................. | A61C 8/0068 |
| 2017/0056132 A1* | 3/2017 | Kwan | .................... | A61C 8/0051 |
| 2017/0151039 A1* | 6/2017 | Lee | .......... | A61C 9/00 |
| 2017/0290645 A1* | 10/2017 | Rostami | ............... | A61C 8/0006 |
| 2018/0110593 A1* | 4/2018 | Khalil | ................... | A61F 2/2803 |
| 2019/0247149 A1* | 8/2019 | Simmonds | ............ | A61C 8/005 |
| 2020/0315749 A1* | 10/2020 | Kim | .................... | A61C 8/0056 |

\* cited by examiner

DENTAL IMPLANT DEVICE AND TECHNIQUE

PRIORITY CLAIM

This application claims priority to and/or the benefit of U.S. provisional patent application Ser. No. 62/557,611 filed Sep. 12, 2017. The foregoing application is incorporated by reference in its entirety as if fully set forth herein.

FIELD OF THE INVENTION

This invention relates generally to a dental implant device and technique for the replacement of missing bone and inadequate bone level, and tools for its implementation.

SUMMARY

This invention relates generally to a dental implant device and technique for the replacement of missing bone and inadequate bone level, and tools for its implementation. Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

This invention solves several longstanding issues experienced by patients with dental implants. First the honeycomb-like structure of the implant block is filled with bone dust or another suitable substance which enables the jaw to properly adhere and grow into the implant block, thereby ensuring a solid connection. Second, the ball bearings nestled between the dental implant and tooth abutment help provide a small amount of cushioning and mobility similar to what a tooth would experience in the case of a natural tooth from its root and the below bone, thereby reducing the chance breakage and reducing wear over time. The bearings provide a variable level of cushioning depending on what sort of bearings or other cushion mechanisms are included. The level of cushioning can also be set to ensure that the tooth is not too soft when compressed, ensuring that the implant functions as well as a natural tooth. This invention allows a dentist or other professional to fix bone defects in situations where a patient's jaw bone or portions thereof are missing due to disease or trauma and can be adapted to jaw bone, craniofacial bones or otherwise any bone in the body so long as the implant block can be milled into the shape of the missing bone area with biocompatible materials in order to bring back both function and aesthetic appearance to the affected area while also providing a framework for bone to regenerate into. In the situation where a tooth is not missing, the invention is able to encircle teeth that have been infected with periodontal disease or have suffered other disease or trauma that has affected, destroyed and/or weakened area around a tooth, supporting it and restoring the missing bone to its natural level by providing support to the tooth and eliminating visual defects.

In one embodiment, a device for the replacement of missing bone and inadequate bone level comprises: one or more implant blocks, the one or more implant blocks characterized at least partially by a honeycomb-like structure with one or more apertures; one or more tooth implants, the tooth implants shaped to fit in the one or more apertures of the one or more implant blocks, and having one or more apertures in a top surface and having one or more recesses in the one or more apertures in a top surface; one or more tooth abutments, the one or more tooth abutments including one or more members placed complementary to the shape of the one or more recesses of the one or more tooth implants; and one or more crowns, the one or more crowns shaped to fit over the one or more tooth abutments.

In one embodiment, a device for the replacement of missing bone and inadequate bone level is comprised of one or more implant blocks, shaped to fill in gaps in a human maxilla and a human mandible bones, the one or more implant blocks comprised of an inner and outer layer characterized by a honeycomb-like structure, and one or more threaded holes separated by a raised crest; one or more screws or other fastening mechanisms; one or more tooth implants, shaped in a conical form with threading cut to fit in the one or more threaded holes of the one or more implant blocks, and having a threaded internal hole in their base; one or more tooth abutments, including one or more members on a side with threading complementary to the threading of the one or more tooth implants, and a support structure; and one or more crowns, shaped to fit over the support structure of the one or more tooth abutments.

In one embodiment the one or more implant blocks may be molded to fit a patient's mouth at the block's creation, or it may be prepared as a block of material and then sculpted to fit the patient's jaw as needed. The one or more tooth implants may be comprised of a variety of materials including but not limited to dental zirconia, titanium, tantalum, PLGA polymer, and/or bone scaffolding, or may be comprised of a composition of different materials or may have individual components each comprised of a different material. The tooth implant may be threaded on its outside surface or in the aperture in a manner complementary to the threading of the hole of the one or more implant blocks or for a member of a tooth abutment respectively. In some embodiments the material comprising the one or more implant blocks is covered in a substance from a list including but not limited to hydroxyapatite to facilitate bone integration.

In one embodiment the one or more implant blocks may be shaped to fit missing spaces in the human jawbone specifically or may be shaped to fit with extra material to allow a puzzle-piece like fit to the location. The one or more implant blocks may be comprised of one or more pieces as necessary to provide a proper fit. The one or more implant blocks may be as small as 2 mm×2 mm×2 mm and as large as 15 cm×15 cm×15 cm. The one or more implant blocks may be comprised of one or more layers, including but not limited to an outer layer of material and an inner layer of material. The inner layer or layers of material may be characterized by a honeycomb-like structure that may be filled in with another material, including but not limited to powdered bone, to facilitate bone reconstruction. In some embodiments, the implant block may separate the one or more apertures with a raised crest. In some embodiments the one or more implant blocks has a texture from the list including, but not limited to, porous, sponge-like, and/or latticework.

In one embodiment the one or more implant blocks may be further comprised of one or more apertures which may or may not be threaded, the holes being designed to accommodate a tooth implant. In some embodiments the holes are not threaded and are instead mechanical securing mechanisms complementary to securing mechanisms on a tooth implant, such as a hook, latch, flange, or notch that either the block or implant clicks into. The implant and/or implant block may be magnetized if it is comprised of a material capable of being magnetized. The holes may be characterized by a variety of shapes including but not limited to polygonal, conical, pyramidal or cylindrical. The holes may also be separated or lie upon a raised crest meant to simulate the ridge of a human jaw.

In one embodiment the honeycomb-like structure is comprised of honeycomb pockets of a uniform shape that may or may not be interconnected with each other and may or may not permeate entirely into the structure. In one embodiment the honeycomb-like structure may be comprised of numerous spheres and partial spheres that may or may not overlap and/or be interconnected with each other. The shape of the pockets comprising the structure within the honeycomb-like structure may vary depending on the needs of the patient. The pockets can range in diameter from 0.1 millimeters to 1.5 centimeters in diameter. In one embodiment the entire implant block is permeated with the honeycomb-like structure, while in other embodiments the honeycomb-like structure only permeates a portion of the implant block; sometimes only permeating the exterior, or interior of the implant block. In some embodiments the implant block's texture may be characterized as porous, honeycomb-like, latticework, crystalline, or other manners in which a solid has numerous holes and/or inclusions.

In some embodiments, the one or more screws or fastening mechanisms are one or more screws, securing the pieces of the device together. In some embodiments they are fastening mechanisms including, but not limited to, hinges, latches, hooks, magnets, or pegs. The one or more screws or other fastening mechanisms may be comprised of a variety of materials including but not limited to titanium and may be inserted through the side or top of the one or more implant blocks in order to secure it to existing jaw bone structure if necessary, or additionally may be used to secure components of the dental implant device 100 together. The one or more screws or other fastening mechanisms may be from 1 mm to 10 mm in radius and from 1 mm to 30 mm long.

The one or more tooth implants may be shaped in a variety of forms including but not limited to polygonal, conical, pyramidal or cylindrical in order to fit in the holes of the one or more implant blocks. The one or more tooth implants may be anywhere from 1 mm to 15 mm in radius and from 1 mm to 35 mm long. The one or more tooth implants may have an exposed internal hole depending on the shape of the one or more tooth implants, designed for holding a tooth abutment. The hole may be characterized by a variety of shapes including but not limited to polygonal, conical, pyramidal or cylindrical. The hole may be from 1 mm to 10 mm in radius and from 1 mm to 30 mm long. The hole may include cushioning or support mechanisms to support a tooth abutment including but not limited to: ball bearings or springs. The cushioning inclusions 116 can be located at the bottom of the aperture, along the sides of the aperture, or anywhere else a practitioner deems will allow them to cushion force on the implant itself. The one or more tooth implants may be comprised of a variety of materials including but not limited to dental zirconia, titanium, tantalum, PLGA polymer, and/or bone scaffolding, or may be comprised of a composition of different materials or may have individual components each comprised of a different material. The tooth implant may be threaded on its outside surface or in the hole in a manner complementary to the threading of the hole of the one or more implant blocks or for a member of a tooth abutment respectively.

The one or more tooth abutments may be shaped in a variety of forms including but not limited to polygonal, conical, pyramidal, oblong, or cylindrical in order to fit in the holes of the one or more tooth implants. The one or more tooth abutments may have one or more members shaped to fit the holes of the one or more tooth implants. The members may further comprise cushioning inclusions 116 including, but not limited to, ball bearings or springs. The cushioning inclusions 116 may be located on the sides of the abutments and/or inside a channel they connect to. The cushioning inclusions 116 may be located at the base of the abutments. The members may be threaded complementary to threading on the one or more apertures of the one or more tooth implants. The shape of the one or more tooth abutments need not be symmetrical and they may take any shape as needed to fit the patient's need. The one or more tooth abutments may be anywhere from 1 mm×1 mm×1 mm to 30 mm×30 mm×30 mm in dimensions. The one or more tooth abutments may be comprised of a variety of materials, including but not limited to dental zirconia, titanium, tantalum, PLGA polymer, and/or bone scaffolding, or may be comprised of a composition of different materials or may have individual components each comprised of a different material. The one or more tooth abutments may include a support structure capable of supporting one or more crowns. The support structure may include a variety of securing mechanisms, including but not limited to, latches, pressure seals, hinges, locks, adhesives, and/or dental cements.

In some embodiments, the one or more tooth abutments are milled from a variety of angles including laterally or longitudinally. In some embodiments, the milling process prevents there from being space between the implant and abutment. In some embodiments the one or more tooth abutments and/or tooth crowns are milled as a single piece or separately.

The one or more crowns may be shaped in a variety of forms including but not limited to polygonal, conical, pyramidal, oblong, or cylindrical in order to fit in the support structure of the one or more tooth abutments. The shape of the one or more crowns need not be symmetrical and they may take any shape as needed to fit the patient's need. The one or more crowns may be anywhere from 1 mm×1 mm×1 mm to 30 mm×30 mm×30 mm in dimensions. The one or more crowns may be comprised of a variety of materials including but not limited to dental zirconia, titanium, tantalum, PLGA polymer, and/or bone scaffolding, or may be comprised of a composition of different materials or may have individual components each comprised of a different material. The one or more crowns may include a variety of securing mechanisms, including but not limited to, latches, pressure seals, hinges, locks, adhesives, and/or dental cements to secure them to a support structure.

In some embodiments, the tooth implant and tooth abutment are a singular component. In some embodiments, a seal or washer may be placed between the tooth implant and tooth abutment, which may provide cushioning when a downward force is placed on the tooth implant device, while also preventing a gap into which food or other damaging particles may intrude. The seal or washer may be comprised of a variety of materials including but not limited to silicone.

The device may include a means for engaging the one or more tooth abutments into the one or more tooth implants and/or the one or more crowns into the one or more tooth abutments. In one embodiment the device is based on a plier design wherein one side of the plier holds the abutment while another utilizes a peg to press down onto an engagement mechanism. The device may alternatively take a variety of forms including but not limited to scissors, pliers, clamps, wrenches, or other tools.

In one embodiment, the invention is a method for the replacement of missing bone and inadequate bone level wherein the method is comprised of: preparing an implant block from a block of material by shaping the block to fit a gap in at least one of a human maxilla and human mandible; drilling one or more implant holes on the crest of the implant block; drilling one or more apertures into the side of the implant block to secure the implant block to the at least one of the human maxilla and human mandible; placing the implant block into the gap in at least one of the human maxilla and the human mandible; placing the one or more implant screws into the one or more apertures of the one or more implant blocks; using a securing mechanism to secure the implant block to the at least one of a human maxilla and human mandible; placing a filler medium at least one of inside and around the implant block to fill in the honeycomb-like structure; placing a membrane over the implant block to contain the medium; placing one or more tooth abutments into the one or more dental implants; and finally placing one or more crowns onto the one or more tooth abutments.

BRIEF DESCRIPTION OF THE DRAWINGS

Embodiments of the present invention are described in detail below with reference to the following drawings.

DETAILED DESCRIPTION

This invention relates generally to a dental implant device and technique for the replacement of missing bone and inadequate bone level, and tools for its implementation. Specific details of certain embodiments of the invention are set forth in the following description and in FIGS. 1-6 to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
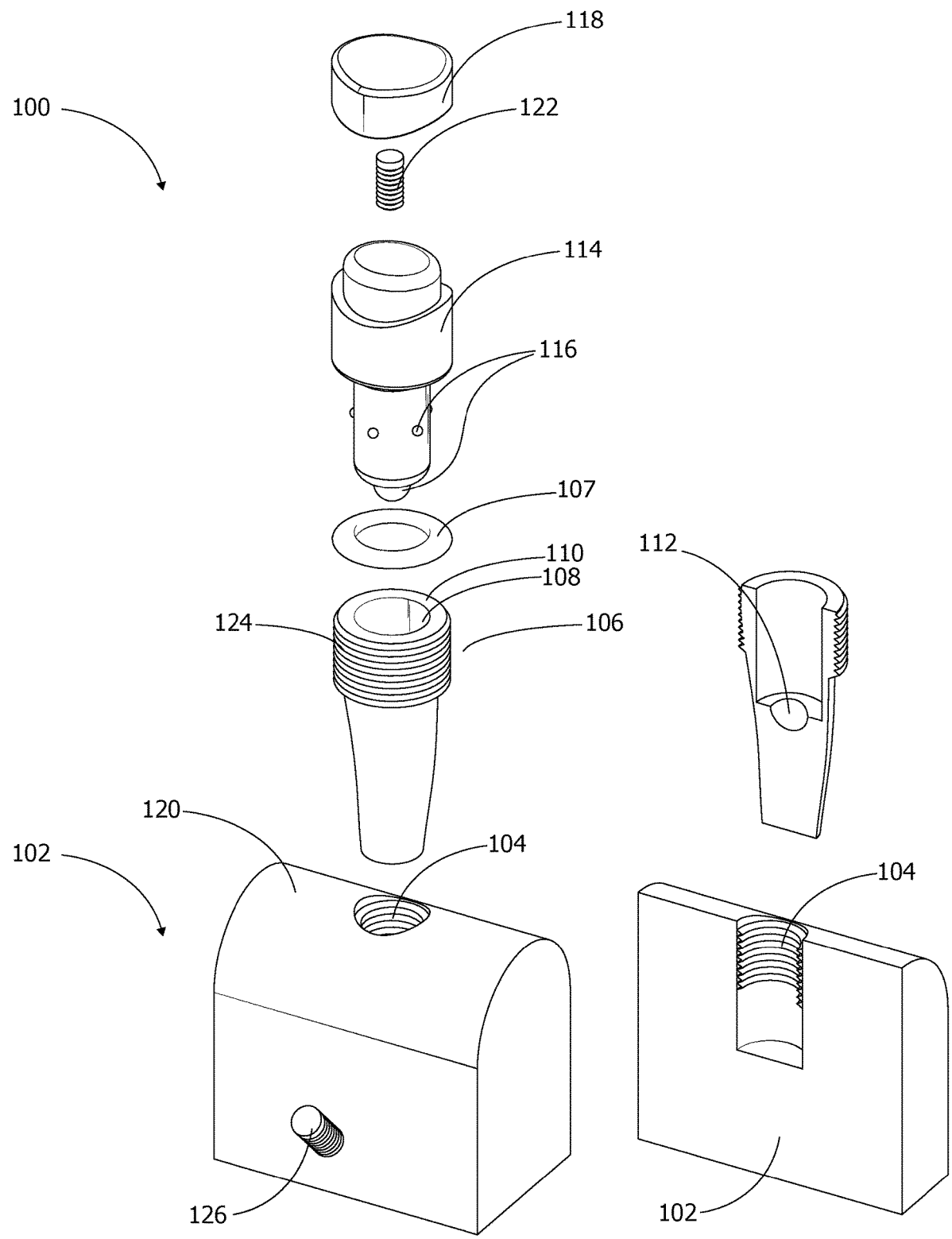
FIG. 1 is a perspective, exploded view of a dental implant and implant block, in accordance with an embodiment of the invention.

FIG. 1 is a perspective, exploded view of a dental implant and implant block, in accordance with an embodiment of the invention. In one embodiment, a device for the replacement of missing bone and inadequate bone level 100 comprises: one or more implant blocks 102, the one or more implant blocks 102 characterized at least partially by a honeycomb-like structure with one or more apertures 104; one or more tooth implants 106, the tooth implants 106 shaped to fit in the one or more apertures 104 of the one or more implant blocks 102, and having one or more apertures 108 in a top surface 110 and having one or more recesses 112 in the one or more apertures 108 in a top surface 110; one or more tooth abutments 114, the one or more tooth abutments 114 including one or more inclusions 116 placed complementary to the shape of the one or more recesses 112 of the one or more tooth implants 106; and one or more crowns 118, the one or more crowns 118 shaped to fit over the one or more tooth abutments 114. In some embodiments the implant block 102 may be fastened to the bone of a patient by a screw 126 or other securing mechanism.

In one embodiment, a device for the replacement of missing bone and inadequate bone level 100 is comprised of one or more implant blocks 102, shaped to fill in gaps in a human maxilla and a human mandible bones, the one or more implant blocks 102 comprised of an inner and outer layer characterized by a honeycomb-like structure, and one or more threaded apertures 104 separated by a raised crest 120; one or more screws 122; one or more tooth implants 106, shaped in a conical form with threading 124 cut to fit in the one or more threaded apertures 104 of the one or more implant blocks 102, and having a threaded internal hole in their top; one or more tooth abutments 114, including one or more members on a side with threading complementary to the threading of the one or more tooth implants 106, and a support structure; and one or more crowns 118, shaped to fit over the support structure of the one or more tooth abutments 114.

In one embodiment the one or more implant blocks 102 may be molded to fit a patient's mouth at the block's creation, or it may be prepared as a block of material and then sculpted to fit the patient's jaw as needed. The one or more implant blocks 102 may be comprised of a variety of materials including but not limited to dental zirconia, titanium, tantalum, PLGA polymer, and/or bone scaffolding, or may be comprised of a composition of different materials or may have individual components each comprised of a different material. The one or more implant blocks 102 may be comprised of materials hereinafter developed suitable for dental implantation purposes.

In one embodiment the one or more implant blocks 102 may be shaped to fit missing spaces in the human jawbone specifically or may be shaped to fit with extra material to allow a puzzle-piece like fit to the location. The one or more implant blocks 102 may be comprised of one or more pieces as necessary to provide a proper fit. The one or more implant blocks 102 may be as small as 2 mm×2 mm×2 mm and as large as 15 cm×15 cm×15 cm. The one or more implant blocks 102 may be comprised of one or more layers, including but not limited to an outer layer of material and an inner layer of material. The inner layer or layers of material may be characterized by a honeycomb-like structure that may be filled in with another material, including but not limited to powdered bone, to facilitate bone reconstruction. In some embodiments, the implant block 102 may separate the one or more apertures 104 with a raised crest 120.

In one embodiment the one or more implant blocks 102 may be further comprised of one or more apertures 104 which may or may not be threaded, the one or more apertures being designed to accommodate a tooth implant 106. In some embodiments the one or more apertures 104 are not threaded and are instead mechanical securing mechanisms complementary to securing mechanisms on a tooth implant 106, such as a hook, latch, flange, or notch that either the block 102 or implant 106 clicks into. The implant 106 and/or implant block 102 may be magnetized if it is comprised of a material capable of being magnetized. The one or more apertures 104 may be characterized by a variety of shapes including but not limited to polygonal, conical, pyramidal or cylindrical. The one or more apertures 104 may also be separated or lie upon a raised crest meant to simulate the ridge of a human jaw.

In one embodiment the honeycomb-like structure is comprised of honeycomb pockets of a uniform shape that may or may not be interconnected with each other and may or may not permeate entirely into the structure. In one embodiment the honeycomb-like structure may be comprised of numerous spheres and partial spheres that may or may not overlap and/or be interconnected with each other. The shape of the pockets comprising the structure within the honeycomb-like structure may vary depending on the needs of the patient. The pockets can range in diameter from 0.1 millimeters to 1.5 centimeters in diameter. In one embodiment the entire implant block 102 is permeated with the honeycomb-like structure, while in other embodiments the honeycomb-like structure only permeates a portion of the implant block 102; sometimes only permeating the exterior, or interior of the implant block 102.

In some embodiments, the one or more screws 122 or fastening mechanisms are one or more screws 122, securing the pieces of the device together. In some embodiments the one or more screws 122 are fastening mechanisms including, but not limited to, hinges, latches, hooks, magnets, or pegs. The one or more screws 122 or other fastening mechanisms may be comprised of a variety of materials including but not limited to titanium and may be inserted through the side or top of the one or more implant blocks 102 in order to secure it to existing jaw bone structure if necessary, or additionally may be used to secure components of the dental implant device 100 together. The one or more screws 122 or other fastening mechanisms may be from 1 mm to 10 mm in radius and from 1 mm to 30 mm long.

The one or more tooth implants 106 may be shaped in a variety of forms including but not limited to polygonal, conical, pyramidal or cylindrical in order to fit in the holes of the one or more implant blocks 102. The one or more tooth implants 106 may be anywhere from 1 mm to 15 mm in radius and from 1 mm to 35 mm long. The one or more tooth implants 106 may have one or more exposed internal apertures 108 depending on the shape of the one or more tooth implants 106, designed for holding a tooth abutment 114. The aperture 108 may be characterized by a variety of shapes including but not limited to polygonal, conical, pyramidal or cylindrical. The aperture 108 may be from 1 mm to 10 mm in radius and from 1 mm to 30 mm long. The aperture 108 may include cushioning or support inclusions 116 to support a tooth abutment 114 including but not limited to: ball bearings or springs. The cushioning inclusions 116 can be located at the bottom of the aperture 108, along the sides of the aperture 108, or anywhere else a practitioner deems will allow them to cushion force on the implant itself. The one or more tooth implants 106 may be comprised of a variety of materials including but not limited to dental zirconia, titanium, tantalum, PLGA polymer, and/or bone scaffolding, or may be comprised of a composition of different materials or may have individual components each comprised of a different material. The tooth implant 106 may be threaded on its outside surface or in the aperture 108 in a manner complementary to the threading of the hole of the one or more implant blocks 102 or for a member of a tooth abutment 114 respectively. In some embodiments the material comprising the one or more implant blocks 102 is covered in a substance from a list including but not limited to hydroxyapatite to facilitate bone integration.

The one or more tooth abutments 114 may be shaped in a variety of forms including but not limited to polygonal, conical, pyramidal, oblong, or cylindrical in order to fit in the holes of the one or more tooth implants 106. The one or more tooth abutments 114 may have one or more members shaped to fit the holes of the one or more tooth implants 106. The members may further comprise cushioning inclusions 116 including, but not limited to, ball bearings or springs. The cushioning inclusions 116 may be located on the sides of the abutments and/or inside a channel they connect to. The cushioning inclusions 116 may be located at the base of the abutments. The members may be threaded complementary to threading on the one or more apertures of the one or more tooth implants 106. The shape of the one or more tooth abutments 114 need not be symmetrical and they may take any shape as needed to fit the patient's need. The one or more tooth abutments 114 may be anywhere from 1 mm×1 mm×1 mm to 30 mm×30 mm×30 mm in dimensions. The one or more tooth abutments 114 may be comprised of a variety of materials, including but not limited to dental zirconia, titanium, tantalum, PLGA polymer, and/or bone scaffolding, or may be comprised of a composition of different materials or may have individual components each comprised of a different material. The one or more tooth abutments 114 may include a support structure capable of supporting one or more crowns 118. The support structure may include a variety of securing mechanisms, including but not limited to, latches, pressure seals, hinges, locks, adhesives, and/or dental cements.

In some embodiments, the one or more tooth abutments 114 and/or crowns 118 are milled from a variety of angles including laterally or longitudinally. In some embodiments, the milling process prevents there from being space between the implant 106 and abutment 114. In some embodiments, the milling machine performing the milling may need to be modified to accommodate the one or more tooth abutments and/or crowns 118 and the angle to mill them from.

The one or more crowns 118 may be shaped in a variety of forms including but not limited to polygonal, conical, pyramidal, oblong, or cylindrical in order to fit in the support structure of the one or more tooth abutments 114. The shape of the one or more crowns 118 need not be symmetrical and they may take any shape as needed to fit the patient's need. The one or more crowns 118 may be anywhere from 1 mm×1 mm×1 mm to 30 mm×30 mm×30 mm in dimensions. The one or more crowns 118 may be comprised of a variety of materials including but not limited to dental zirconia, titanium, tantalum, PLGA polymer, gold, silver, stainless steel, zirconia, other metal composites, porcelain, glasses, and/or bone scaffolding, or may be comprised of a composition of different materials or may have individual components each comprised of a different material. The one or more crowns 118 may include a variety of securing mechanisms, including but not limited to, latches, pressure seals, hinges, locks, adhesives, and/or dental cements. to secure them to a support structure.

In some embodiments, the tooth implant 106 and tooth abutment 114 are a singular component. In some embodiments, a seal or washer 107 may be placed between the tooth implant 106 and tooth abutment 114, which may provide cushioning when a downward force is placed on the tooth implant 100 device, while also preventing a gap into which food or other damaging particles may intrude. The seal or washer 107 may be comprised of a variety of materials including but not limited to silicone, synthetic rubber, rubber, plastic, or other synthetic or natural materials.

The device may include a means for engaging the one or more tooth. In one embodiment the device is based on a plier design wherein one side of the plier holds the tooth abutment 114 while another utilizes a peg to press down onto an engagement mechanism. The device may alternatively take a variety of forms including but not limited to scissors, pliers, clamps, wrenches, or other tools. The means may also be attached to a handle or other tube device to interact with the one or more tooth abutments 114 or one or more tooth implants 106. In some embodiments the engagement mechanism is a spring-peg mechanism, while in other embodiments may include, but are not limited to, screws, latches, hooks, or other variations of a spring-based system.

In one embodiment, the invention is a method for the replacement of missing bone and inadequate bone level wherein the method is comprised of: preparing an implant block from a block of material by shaping the block to fit a gap in at least one of a human maxilla and human mandible; drilling one or more implant holes on the crest of the implant block; drilling one or more apertures into the side of the implant block 102 to secure the implant block 102 to the at least one of the human maxilla and human mandible; placing the implant block into the gap in at least one of the human maxilla and the human mandible; placing the one or more implant screws into the one or more apertures of the one or more implant blocks 102; using a securing mechanism to secure the implant block 102 to the at least one of a human maxilla and human mandible; placing a filler medium at least one of inside and around the implant block 102 to fill in the honeycomb-like structure; placing a membrane over the implant block 102 to contain the medium; placing one or more tooth abutments 114 into the one or more dental implants; and finally placing one or more crowns 118 onto the one or more tooth abutments 114.

Figure 2:
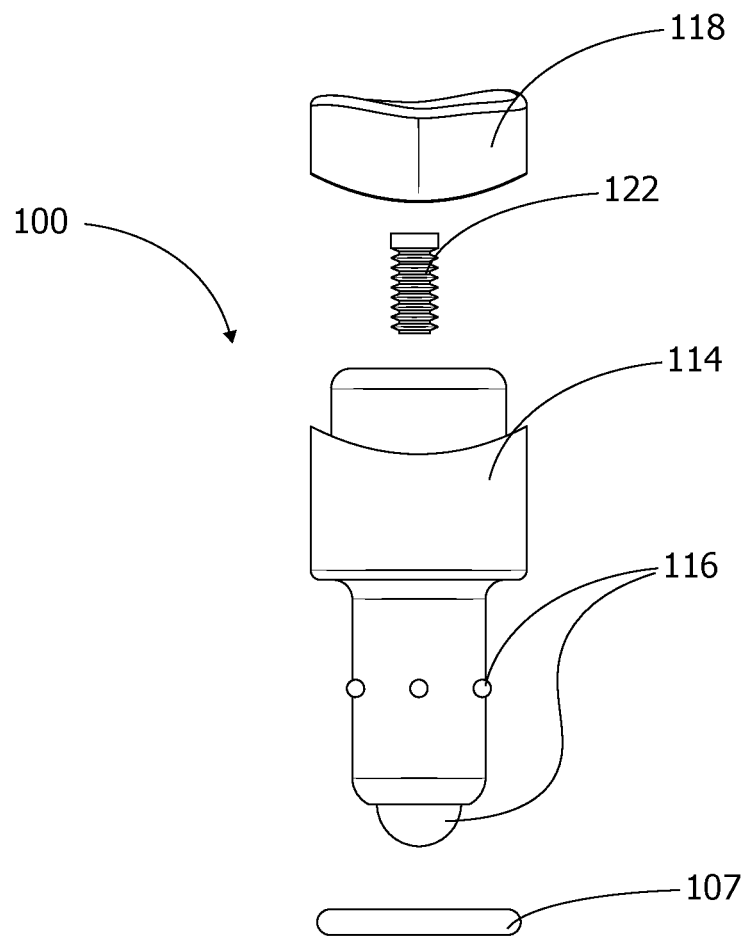
FIG. 2 is a side, exploded view of a dental implant, in accordance with an embodiment of the invention.
Figure 2:
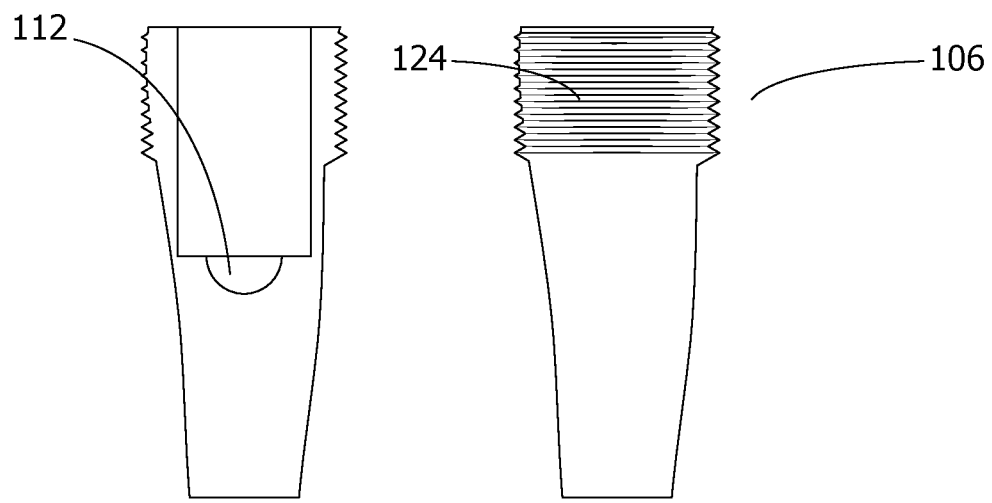

FIG. 2 is a side, exploded view of a dental implant, in accordance with an embodiment of the invention. In one embodiment, a device for the replacement of missing bone and inadequate bone level 100 comprises: one or more implant blocks 102, the one or more implant blocks characterized at least partially by a honeycomb-like structure with one or more apertures 104; one or more tooth implants 106, the tooth implants 106 shaped to fit in the one or more apertures 104 of the one or more implant blocks, and having one or more apertures in a top surface 110 and having one or more recesses in the one or more apertures in a top surface 110; one or more tooth abutments 114, the one or more tooth abutments 114 including one or more inclusions 116 placed complementary to the shape of the one or more recesses 112 of the one or more tooth implants 106; and one or more crowns 118, the one or more crowns 118 shaped to fit over the one or more tooth abutments 114.

In one embodiment, a device for the replacement of missing bone and inadequate bone level 100 is comprised of one or more implant blocks, shaped to fill in gaps in a human maxilla and a human mandible bones, the one or more implant blocks 102 comprised of an inner and outer layer characterized by a honeycomb-like structure, and one or more threaded apertures separated by a raised crest; one or more screws 122; one or more tooth implants 106, shaped in a conical form with threading 124 cut to fit in the one or more threaded apertures of the one or more implant blocks, and having a threaded internal hole in their top; one or more tooth abutments 114, including one or more members on a side with threading complementary to the threading of the one or more tooth implants 106, and a support structure; and one or more crowns 118, shaped to fit over the support structure of the one or more tooth abutments 114.

In one embodiment the one or more implant blocks 102 may be further comprised of one or more apertures which may or may not be threaded, the one or more apertures being designed to accommodate a tooth implant 106. In some embodiments the one or more apertures are not threaded and are instead mechanical securing mechanisms complementary to securing mechanisms on a tooth implant 106, such as a hook, latch, flange, or notch that either the block or implant 106 clicks into. The implant 106 and/or implant block may be magnetized if it is comprised of a material capable of being magnetized. The one or more apertures 104 may be characterized by a variety of shapes including but not limited to polygonal, conical, pyramidal or cylindrical. The one or more apertures 104 may also be separated or lie upon a raised crest meant to simulate the ridge of a human jaw.

In one embodiment the honeycomb-like structure is comprised of honeycomb pockets of a uniform shape that may or may not be interconnected with each other and may or may not permeate entirely into the structure. In one embodiment the honeycomb-like structure may be comprised of numerous spheres and partial spheres that may or may not overlap and/or be interconnected with each other. The shape of the pockets comprising the structure within the honeycomb-like structure may vary depending on the needs of the patient. The pockets can range in diameter from 0.1 millimeters to 1.5 centimeters in diameter. In one embodiment the entire implant block 102 is permeated with the honeycomb-like structure, while in other embodiments the honeycomb-like structure only permeates a portion of the implant block 102; sometimes only permeating the exterior, or interior of the implant block 102.

In some embodiments, the one or more screws 122 or fastening mechanisms are one or more screws 122, securing the pieces of the device together. In some embodiments the one or more screws 122 are fastening mechanisms including, but not limited to, hinges, latches, hooks, magnets, or pegs. The one or more screws 122 or other fastening mechanisms may be comprised of a variety of materials including but not limited to titanium and may be inserted through the side or top of the one or more implant blocks 102 in order to secure it to existing jaw bone structure if necessary, or additionally may be used to secure components of the dental implant device 100 together. The one or more screws 122 or other fastening mechanisms may be from 1 mm to 10 mm in radius and from 1 mm to 30 mm long.

The one or more tooth implants 106 may be shaped in a variety of forms including but not limited to polygonal, conical, pyramidal or cylindrical in order to fit in the holes of the one or more implant blocks. The one or more tooth implants 106 may be anywhere from 1 mm to 15 mm in radius and from 1 mm to 35 mm long. The one or more tooth implants 106 may have one or more exposed internal apertures depending on the shape of the one or more tooth implants 106, designed for holding a tooth abutment 114. The aperture may be characterized by a variety of shapes including but not limited to polygonal, conical, pyramidal or cylindrical. The aperture may be from 1 mm to 10 mm in radius and from 1 mm to 30 mm long. The aperture 108 may include cushioning or support inclusions 116 to support a tooth abutment 114 including but not limited to: ball bearings or springs. The cushioning inclusions 116 can be located at the bottom of the aperture, along the sides of the aperture, or anywhere else a practitioner deems will allow them to cushion force on the implant itself. The one or more tooth implants 106 may be comprised of a variety of materials including but not limited to dental zirconia, titanium, tantalum, PLGA polymer, and/or bone scaffolding, or may be comprised of a composition of different materials or may have individual components each comprised of a different material. The tooth implant 106 may be threaded on its outside surface or in the aperture 108 in a manner complementary to the threading of the hole of the one or more implant blocks or for a member of a tooth abutment 114 respectively. In some embodiments the material comprising the one or more implant blocks is covered in a substance from a list including but not limited to hydroxyapatite to facilitate bone integration.

The one or more tooth abutments 114 may be shaped in a variety of forms including but not limited to polygonal, conical, pyramidal, oblong, or cylindrical in order to fit in the holes of the one or more tooth implants 106. The one or more tooth abutments 114 may have one or more members shaped to fit the holes of the one or more tooth implants 106. The members may further comprise cushioning inclusions 116 including, but not limited to, ball bearings or springs. The cushioning inclusions 116 may be located on the sides of the abutments and/or inside a channel they connect to. The cushioning inclusions 116 may be located at the base of the abutments. The members may be threaded complementary to threading on the one or more apertures of the one or more tooth implants 106. The shape of the one or more tooth abutments 114 need not be symmetrical and they may take any shape as needed to fit the patient's need. The one or more tooth abutments 114 may be anywhere from 1 mm×1 mm×1 mm to 30 mm×30 mm×30 mm in dimensions. The one or more tooth abutments 114 may be comprised of a variety of materials, including but not limited to dental zirconia, titanium, tantalum, PLGA polymer, and/or bone scaffolding, or may be comprised of a composition of different materials or may have individual components each comprised of a different material. The one or more tooth abutments 114 may include a support structure capable of supporting one or more crowns 118. The support structure may include a variety of securing mechanisms, including but not limited to, latches, pressure seals, hinges, locks, adhesives, and/or dental cements.

In some embodiments, the one or more tooth abutments 114 are milled from a variety of angles including laterally or longitudinally. In some embodiments, the milling process prevents there from being space between the implant 106 and abutment 114.

The one or more crowns 118 may be shaped in a variety of forms including but not limited to polygonal, conical, pyramidal, oblong, or cylindrical in order to fit in the support structure of the one or more tooth abutments 114. The shape of the one or more crowns 118 need not be symmetrical and they may take any shape as needed to fit the patient's need. The one or more crowns 118 may be anywhere from 1 mm×1 mm×1 mm to 30 mm×30 mm×30 mm in dimensions. The one or more crowns 118 may be comprised of a variety of materials including but not limited to dental zirconia, titanium, tantalum, PLGA polymer, and/or bone scaffolding, or may be comprised of a composition of different materials or may have individual components each comprised of a different material. The one or more crowns 118 may include a variety of securing mechanisms, including but not limited to, latches, pressure seals, hinges, locks, adhesives, and/or dental cements. to secure them to a support structure.

In some embodiments, the tooth implant 106 and tooth abutment 114 are a singular component. In some embodiments, a seal or washer 107 may be placed between the tooth implant 106 and tooth abutment 114, which may provide cushioning when a downward force is placed on the tooth implant 100 device, while also preventing a gap into which food or other damaging particles may intrude. The seal or washer 107 may be comprised of a variety of materials including but not limited to silicone, synthetic rubber, rubber, plastic, or other synthetic or natural materials.

The device may include a means for engaging the one or more tooth abutments 114 into the one or more tooth implants 106. In one embodiment the device is based on a plier design wherein one side of the plier holds the tooth abutment 114 while another utilizes a peg to press down onto an engagement mechanism. The device may alternatively take a variety of forms including but not limited to scissors, pliers, clamps, wrenches, or other tools. The means may also be attached to a handle or other tube device to interact with the one or more tooth abutments 114 or one or more tooth implants 106. In some embodiments the engagement mechanism is a spring-peg mechanism, while in other embodiments may include, but are not limited to, screws, latches, hooks, or other variations of a spring-based system.

In one embodiment, the invention is a method for the replacement of missing bone and inadequate bone level wherein the method is comprised of: preparing an implant block from a block of material by shaping the block to fit a gap in at least one of a human maxilla and human mandible; drilling one or more implant holes on the crest of the implant block; drilling one or more apertures into the side of the implant block to secure the implant block to the at least one of the human maxilla and human mandible; placing the implant block into the gap in at least one of the human maxilla and the human mandible; placing the one or more implant screws into the one or more apertures of the one or more implant blocks; using a securing mechanism to secure the implant block to the at least one of a human maxilla and human mandible; placing a filler medium at least one of inside and around the implant block to fill in the honeycomb-like structure; placing a membrane over the implant block to contain the medium; placing one or more tooth abutments 114 into the one or more dental implants; and finally placing one or more crowns 118 onto the one or more tooth abutments 114.

Figure 3:
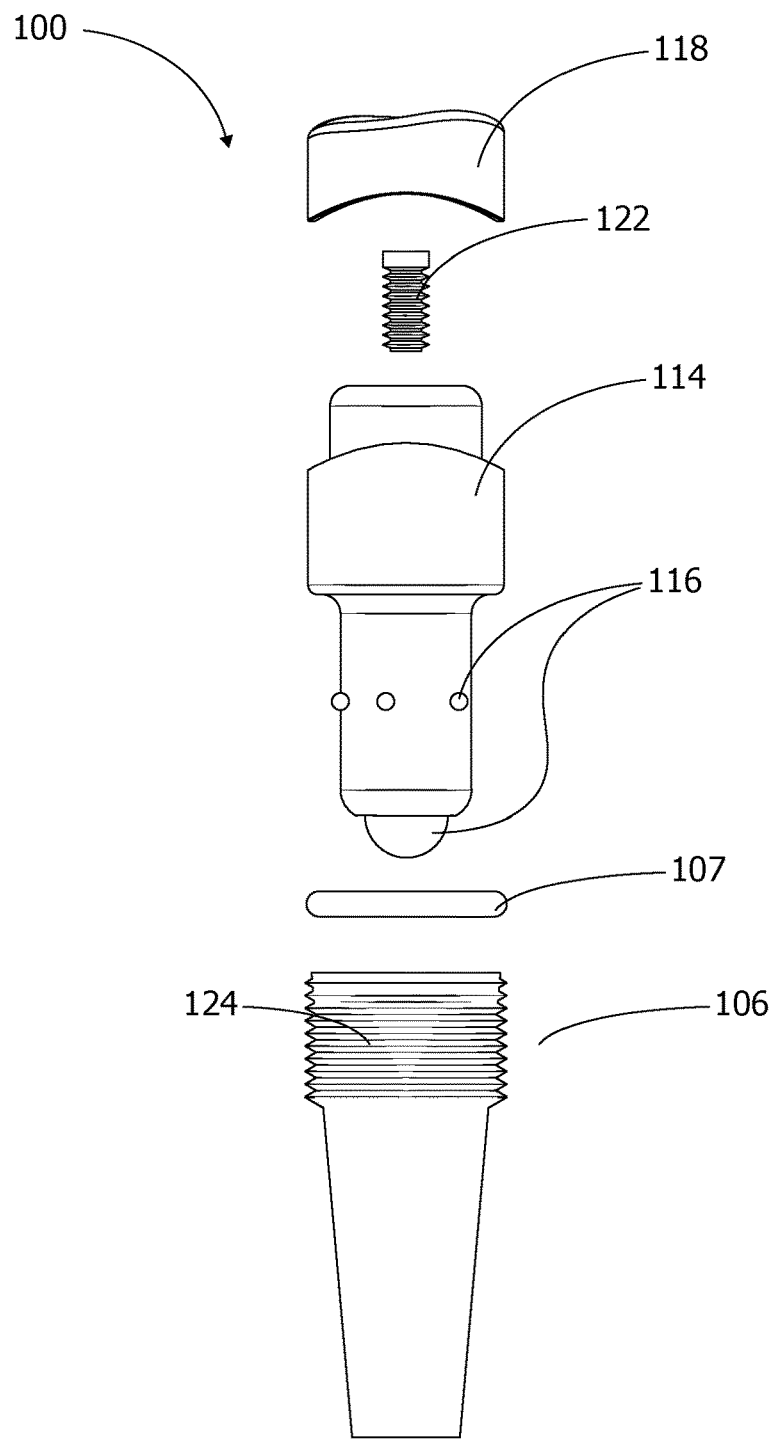
FIG. 3 is a side, exploded view of a dental implant, in accordance with an embodiment of the invention.

FIG. 3 is a side, exploded view of a dental implant, in accordance with an embodiment of the invention. In one embodiment, a device for the replacement of missing bone and inadequate bone level 100 comprises: one or more implant blocks 102, the one or more implant blocks characterized at least partially by a honeycomb-like structure with one or more apertures; one or more tooth implants 106, the tooth implants 106 shaped to fit in the one or more apertures of the one or more implant blocks, and having one or more apertures in a top surface 110 and having one or more recesses in the one or more apertures in a top surface 110; one or more tooth abutments 114, the one or more tooth abutments 114 including one or more inclusions 116 placed complementary to the shape of the one or more recesses 112 of the one or more tooth implants 106; and one or more crowns 118, the one or more crowns 118 shaped to fit over the one or more tooth abutments 114.

In one embodiment, a device for the replacement of missing bone and inadequate bone level 100 is comprised of one or more implant blocks, shaped to fill in gaps in a human maxilla and a human mandible bones, the one or more implant blocks comprised of an inner and outer layer characterized by a honeycomb-like structure, and one or more threaded apertures separated by a raised crest; one or more screws 122; one or more tooth implants 106, shaped in a conical form with threading 124 cut to fit in the one or more threaded apertures of the one or more implant blocks, and having a threaded internal hole in their top; one or more tooth abutments 114, including one or more members on a side with threading complementary to the threading of the one or more tooth implants 106, and a support structure; and one or more crowns 118, shaped to fit over the support structure of the one or more tooth abutments 114.

In one embodiment the one or more implant blocks may be further comprised of one or more apertures which may or may not be threaded, the one or more apertures being designed to accommodate a tooth implant 106. In some embodiments the one or more apertures are not threaded and are instead mechanical securing mechanisms complementary to securing mechanisms on a tooth implant 106, such as a hook, latch, flange, or notch that either the block or implant 106 clicks into. The implant 106 and/or implant block may be magnetized if it is comprised of a material capable of being magnetized. The one or more apertures may be characterized by a variety of shapes including but not limited to polygonal, conical, pyramidal or cylindrical. The one or more apertures may also be separated or lie upon a raised crest meant to simulate the ridge of a human jaw.

In some embodiments, the one or more screws 122 or fastening mechanisms are one or more screws 122, securing the pieces of the device together. In some embodiments the one or more screws 122 are fastening mechanisms including, but not limited to, hinges, latches, hooks, magnets, or pegs. The one or more screws 122 or other fastening mechanisms may be comprised of a variety of materials including but not limited to titanium and may be inserted through the side or top of the one or more implant blocks in order to secure it to existing jaw bone structure if necessary, or additionally may be used to secure components of the dental implant device 100 together. The one or more screws 122 or other fastening mechanisms may be from 1 mm to 10 mm in radius and from 1 mm to 30 mm long.

The one or more tooth implants 106 may be shaped in a variety of forms including but not limited to polygonal, conical, pyramidal or cylindrical in order to fit in the holes of the one or more implant blocks. The one or more tooth implants 106 may be anywhere from 1 mm to 15 mm in radius and from 1 mm to 35 mm long. The one or more tooth implants 106 may have one or more exposed internal apertures depending on the shape of the one or more tooth implants 106, designed for holding a tooth abutment 114. The aperture may be characterized by a variety of shapes including but not limited to polygonal, conical, pyramidal or cylindrical. The aperture may be from 1 mm to 10 mm in radius and from 1 mm to 30 mm long. The aperture may include cushioning or support inclusions 116 to support a tooth abutment 114 including but not limited to: ball bearings or springs. The cushioning inclusions 116 can be located at the bottom of the aperture, along the sides of the aperture, or anywhere else a practitioner deems will allow them to cushion force on the implant itself. The one or more tooth implants 106 may be comprised of a variety of materials including but not limited to dental zirconia, titanium, tantalum, PLGA polymer, and/or bone scaffolding, or may be comprised of a composition of different materials or may have individual components each comprised of a different material. The tooth implant 106 may be threaded on its outside surface or in the aperture in a manner complementary to the threading of the hole of the one or more implant blocks or for a member of a tooth abutment 114 respectively. In some embodiments the material comprising the one or more implant blocks is covered in a substance from a list including but not limited to hydroxyapatite to facilitate bone integration.

The one or more tooth abutments 114 may be shaped in a variety of forms including but not limited to polygonal, conical, pyramidal, oblong, or cylindrical in order to fit in the holes of the one or more tooth implants 106. The one or more tooth abutments 114 may have one or more members shaped to fit the holes of the one or more tooth implants 106. The members may further comprise cushioning inclusions 116 including, but not limited to, ball bearings or springs. The cushioning inclusions 116 may be located on the sides of the abutments and/or inside a channel they connect to. The cushioning inclusions 116 may be located at the base of the abutments. The members may be threaded complementary to threading on the one or more apertures of the one or more tooth implants 106. The shape of the one or more tooth abutments 114 need not be symmetrical and they may take any shape as needed to fit the patient's need. The one or more tooth abutments 114 may be anywhere from 1 mm×1 mm×1 mm to 30 mm×30 mm×30 mm in dimensions. The one or more tooth abutments 114 may be comprised of a variety of materials, including but not limited to dental zirconia, titanium, tantalum, PLGA polymer, and/or bone scaffolding, or may be comprised of a composition of different materials or may have individual components each comprised of a different material. The one or more tooth abutments 114 may include a support structure capable of supporting one or more crowns 118. The support structure may include a variety of securing mechanisms, including but not limited to, latches, pressure seals, hinges, locks, adhesives, and/or dental cements.

In some embodiments, the one or more tooth abutments 114 are milled from a variety of angles including laterally or longitudinally. In some embodiments, the milling process prevents there from being space between the implant 106 and abutment 114.

The one or more crowns 118 may be shaped in a variety of forms including but not limited to polygonal, conical, pyramidal, oblong, or cylindrical in order to fit in the support structure of the one or more tooth abutments 114. The shape of the one or more crowns 118 need not be symmetrical and they may take any shape as needed to fit the patient's need. The one or more crowns 118 may be anywhere from 1 mm×1 mm×1 mm to 30 mm×30 mm×30 mm in dimensions. The one or more crowns 118 may be comprised of a variety of materials including but not limited to dental zirconia, titanium, tantalum, PLGA polymer, and/or bone scaffolding, or may be comprised of a composition of different materials or may have individual components each comprised of a different material. The one or more crowns 118 may include a variety of securing mechanisms, including but not limited to, latches, pressure seals, hinges, locks, adhesives, and/or dental cements. to secure them to a support structure.

In some embodiments, the tooth implant 106 and tooth abutment 114 are a singular component. In some embodiments, a seal or washer 107 may be placed between the tooth implant 106 and tooth abutment 114, which may provide cushioning when a downward force is placed on the tooth implant 100 device, while also preventing a gap into which food or other damaging particles may intrude. The seal or washer 107 may be comprised of a variety of materials including but not limited to silicone, synthetic rubber, rubber, plastic, or other synthetic or natural materials.

The device may include a means for engaging the one or more tooth abutments 114 into the one or more tooth implants 106. In one embodiment the device is based on a plier design wherein one side of the plier holds the tooth abutment 114 while another utilizes a peg to press down onto an engagement mechanism. The device may alternatively take a variety of forms including but not limited to scissors, pliers, clamps, wrenches, or other tools. The means may also be attached to a handle or other tube device to interact with the one or more tooth abutments 114 or one or more tooth implants 106. In some embodiments the engagement mechanism is a spring-peg mechanism, while in other embodiments may include, but are not limited to, screws, latches, hooks, or other variations of a spring-based system.

In one embodiment, the invention is a method for the replacement of missing bone and inadequate bone level wherein the method is comprised of: preparing an implant block from a block of material by shaping the block to fit a gap in at least one of a human maxilla and human mandible; drilling one or more implant holes on the crest of the implant block; drilling one or more apertures into the side of the implant block 102 to secure the implant block to the at least one of the human maxilla and human mandible; placing the implant block into the gap in at least one of the human maxilla and the human mandible; placing the one or more implant screws into the one or more apertures of the one or more implant blocks; using a securing mechanism to secure the implant block to the at least one of a human maxilla and human mandible; placing a filler medium at least one of inside and around the implant block to fill in the honeycomb-like structure; placing a membrane over the implant block to contain the medium; placing one or more tooth abutments 114 into the one or more dental implants; and finally placing one or more crowns 118 onto the one or more tooth abutments 114.

Figure 4:
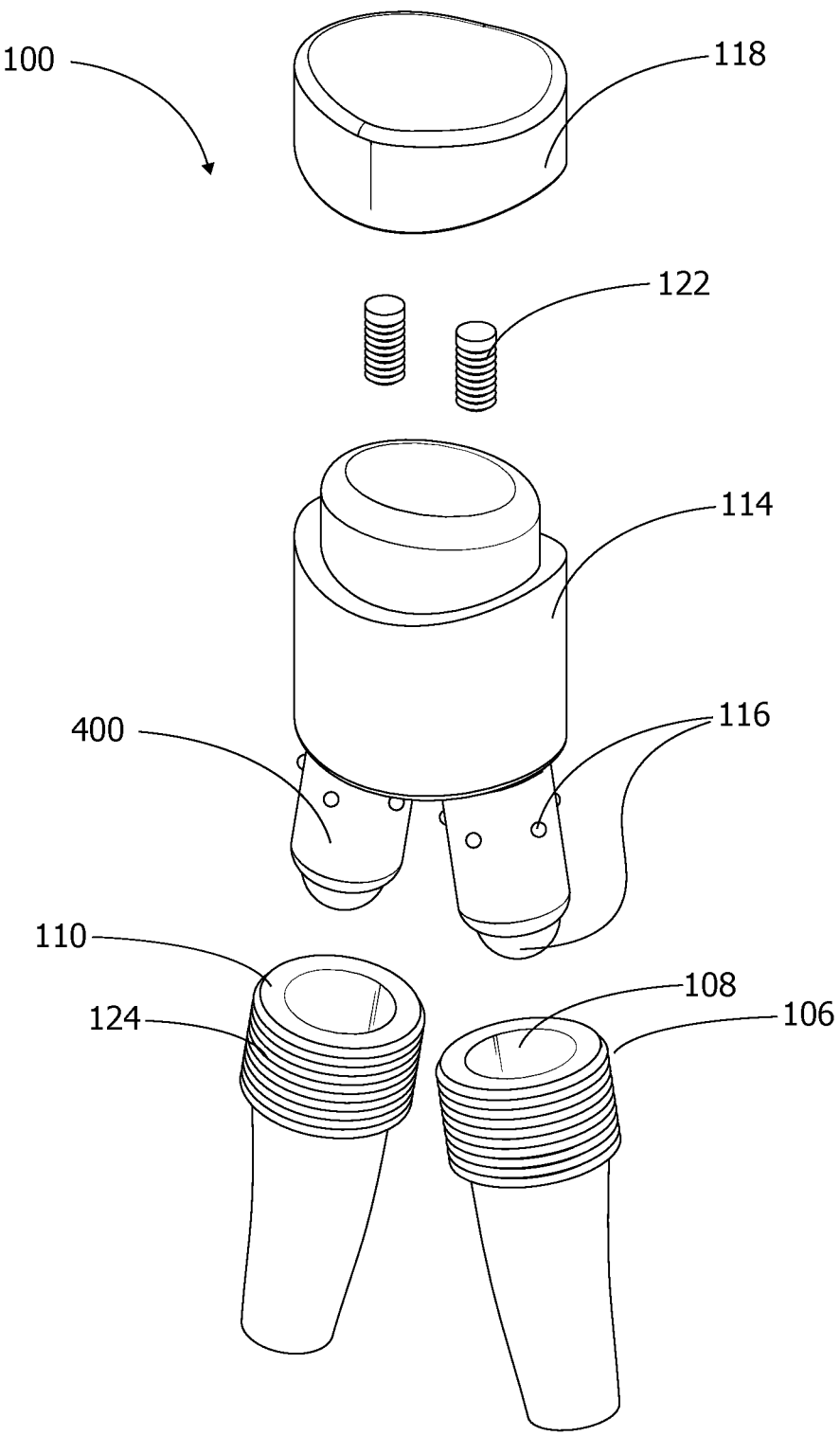
FIG. 4 is a perspective, exploded view of a dental implant and implant block, in accordance with an embodiment of the invention.

FIG. 4 is a perspective, exploded view of a dental implant and implant block, in accordance with an embodiment of the invention. In one embodiment, a device for the replacement of missing bone and inadequate bone level 100 comprises: one or more implant blocks, the one or more implant blocks characterized at least partially by a honeycomb-like structure with one or more apertures 104; one or more tooth implants 106, the tooth implants 106 shaped to fit in the one or more apertures 104 of the one or more implant blocks, and having one or more apertures 108 in a top surface 110 and having one or more recesses 112 in the one or more apertures 108 in a top surface 110; one or more tooth abutments 114, the one or more tooth abutments 114 including one or more inclusions 116 placed complementary to the shape of the one or more recesses 112 of the one or more tooth implants 106; and one or more crowns 118, the one or more crowns 118 shaped to fit over the one or more tooth abutments 114.

In one embodiment, a device for the replacement of missing bone and inadequate bone level 100 is comprised of one or more implant blocks, shaped to fill in gaps in a human maxilla and a human mandible bones, the one or more implant blocks comprised of an inner and outer layer characterized by a honeycomb-like structure, and one or more threaded apertures 104 separated by a raised crest; one or more screws 122; one or more tooth implants 106, shaped in a conical form with threading 124 cut to fit in the one or more threaded apertures 104 of the one or more implant blocks, and having a threaded internal hole in their top; one or more tooth abutments 114, including one or more members on a side with threading complementary to the threading of the one or more tooth implants 106, and a support structure; and one or more crowns 118, shaped to fit over the support structure of the one or more tooth abutments 114.

In some embodiments, the one or more screws 122 or fastening mechanisms are one or more screws 122, securing the pieces of the device together. In some embodiments the one or more screws 122 are fastening mechanisms including, but not limited to, hinges, latches, hooks, magnets, or pegs. The one or more screws 122 or other fastening mechanisms may be comprised of a variety of materials including but not limited to titanium and may be inserted through the side or top of the one or more implant blocks in order to secure it to existing jaw bone structure if necessary, or additionally may be used to secure components of the dental implant device 100 together. The one or more screws 122 or other fastening mechanisms may be from 1 mm to 10 mm in radius and from 1 mm to 30 mm long.

The one or more tooth implants 106 may be shaped in a variety of forms including but not limited to polygonal, conical, pyramidal or cylindrical in order to fit in the holes of the one or more implant blocks. The one or more tooth implants 106 may be anywhere from 1 mm to 15 mm in radius and from 1 mm to 35 mm long. The one or more tooth implants 106 may have one or more exposed internal apertures 108 depending on the shape of the one or more tooth implants 106, designed for holding a tooth abutment 114. The aperture 108 may be characterized by a variety of shapes including but not limited to polygonal, conical, pyramidal or cylindrical. The aperture 108 may be from 1 mm to 10 mm in radius and from 1 mm to 30 mm long. The aperture 108 may include cushioning or support inclusions 116 to support a tooth abutment 114 including but not limited to: ball bearings or springs. The cushioning inclusions 116 can be located at the bottom of the aperture 108, along the sides of the aperture 108, or anywhere else a practitioner deems will allow them to cushion force on the implant itself. The one or more tooth implants 106 may be comprised of a variety of materials including but not limited to dental zirconia, titanium, tantalum, PLGA polymer, and/or bone scaffolding, or may be comprised of a composition of different materials or may have individual components each comprised of a different material. The tooth implant 106 may be threaded on its outside surface or in the aperture 108 in a manner complementary to the threading of the hole of the one or more implant blocks or for a member of a tooth abutment 114 respectively. In some embodiments the material comprising the one or more implant blocks 102 is covered in a substance from a list including but not limited to hydroxyapatite to facilitate bone integration.

The one or more tooth abutments 114 may be shaped in a variety of forms including but not limited to polygonal, conical, pyramidal, oblong, or cylindrical in order to fit in the holes of the one or more tooth implants 106. The one or more tooth abutments 114 may have one or more members 400 shaped to fit the holes of the one or more tooth implants 106. The members 400 may further comprise cushioning inclusions 116 including, but not limited to, ball bearings or springs. The cushioning inclusions 116 may be located on the sides of the abutment members 400 and/or inside a channel they connect to. The cushioning inclusions 116 may be located at the base of the abutments. The members 400 may be threaded complementary to threading on the one or more apertures of the one or more tooth implants 106. The shape of the one or more tooth abutments 114 need not be symmetrical and they may take any shape as needed to fit the patient's need. The one or more tooth abutments 114 may be anywhere from 1 mm×1 mm×1 mm to 30 mm×30 mm×30 mm in dimensions. The one or more tooth abutments 114 may be comprised of a variety of materials, including but not limited to dental zirconia, titanium, tantalum, PLGA polymer, and/or bone scaffolding, or may be comprised of a composition of different materials or may have individual components each comprised of a different material. The one or more tooth abutments 114 may include a support structure capable of supporting one or more crowns 118. The support structure may include a variety of securing mechanisms, including but not limited to, latches, pressure seals, hinges, locks, adhesives, and/or dental cements.

In some embodiments, the one or more tooth abutments 114 are milled from a variety of angles including laterally or longitudinally. In some embodiments, the milling process prevents there from being space between the implant 106 and abutment 114.

The one or more crowns 118 may be shaped in a variety of forms including but not limited to polygonal, conical, pyramidal, oblong, or cylindrical in order to fit in the support structure of the one or more tooth abutments 114. The shape of the one or more crowns 118 need not be symmetrical and they may take any shape as needed to fit the patient's need. The one or more crowns 118 may be anywhere from 1 mm×1 mm×1 mm to 30 mm×30 mm×30 mm in dimensions. The one or more crowns 118 may be comprised of a variety of materials including but not limited to dental zirconia, titanium, tantalum, PLGA polymer, and/or bone scaffolding, or may be comprised of a composition of different materials or may have individual components each comprised of a different material. The one or more crowns 118 may include a variety of securing mechanisms, including but not limited to, latches, pressure seals, hinges, locks, adhesives, and/or dental cements. to secure them to a support structure.

In some embodiments, the tooth implant 106 and tooth abutment 114 are a singular component. In some embodiments, a seal or washer may be placed between the tooth implant 106 and tooth abutment 114, which may provide cushioning when a downward force is placed on the tooth implant 100 device, while also preventing a gap into which food or other damaging particles may intrude. The seal or washer may be comprised of a variety of materials including but not limited to silicone, synthetic rubber, rubber, plastic, or other synthetic or natural materials.

The device may include a means for engaging the one or more tooth abutments 114 into the one or more tooth implants 106. In one embodiment the device is based on a plier design wherein one side of the plier holds the tooth abutment 114 while another utilizes a peg to press down onto an engagement mechanism. The device may alternatively take a variety of forms including but not limited to scissors, pliers, clamps, wrenches, or other tools. The means may also be attached to a handle or other tube device to interact with the one or more tooth abutments 114 or one or more tooth implants 106. In some embodiments the engagement mechanism is a spring-peg mechanism, while in other embodiments may include, but are not limited to, screws, latches, hooks, or other variations of a spring-based system.

In one embodiment, the invention is a method for the replacement of missing bone and inadequate bone level wherein the method is comprised of: preparing an implant block from a block of material by shaping the block to fit a gap in at least one of a human maxilla and human mandible; drilling one or more implant holes on the crest of the implant block; drilling one or more apertures into the side of the implant block to secure the implant block to the at least one of the human maxilla and human mandible; placing the implant block into the gap in at least one of the human maxilla and the human mandible; placing the one or more implant screws into the one or more apertures of the one or more implant blocks; using a securing mechanism to secure the implant block to the at least one of a human maxilla and human mandible; placing a filler medium at least one of inside and around the implant block to fill in the honeycomb-like structure; placing a membrane over the implant block to contain the medium; placing one or more tooth abutments 114 into the one or more dental implants; and finally placing one or more crowns 118 onto the one or more tooth abutments 114.

Figure 5:
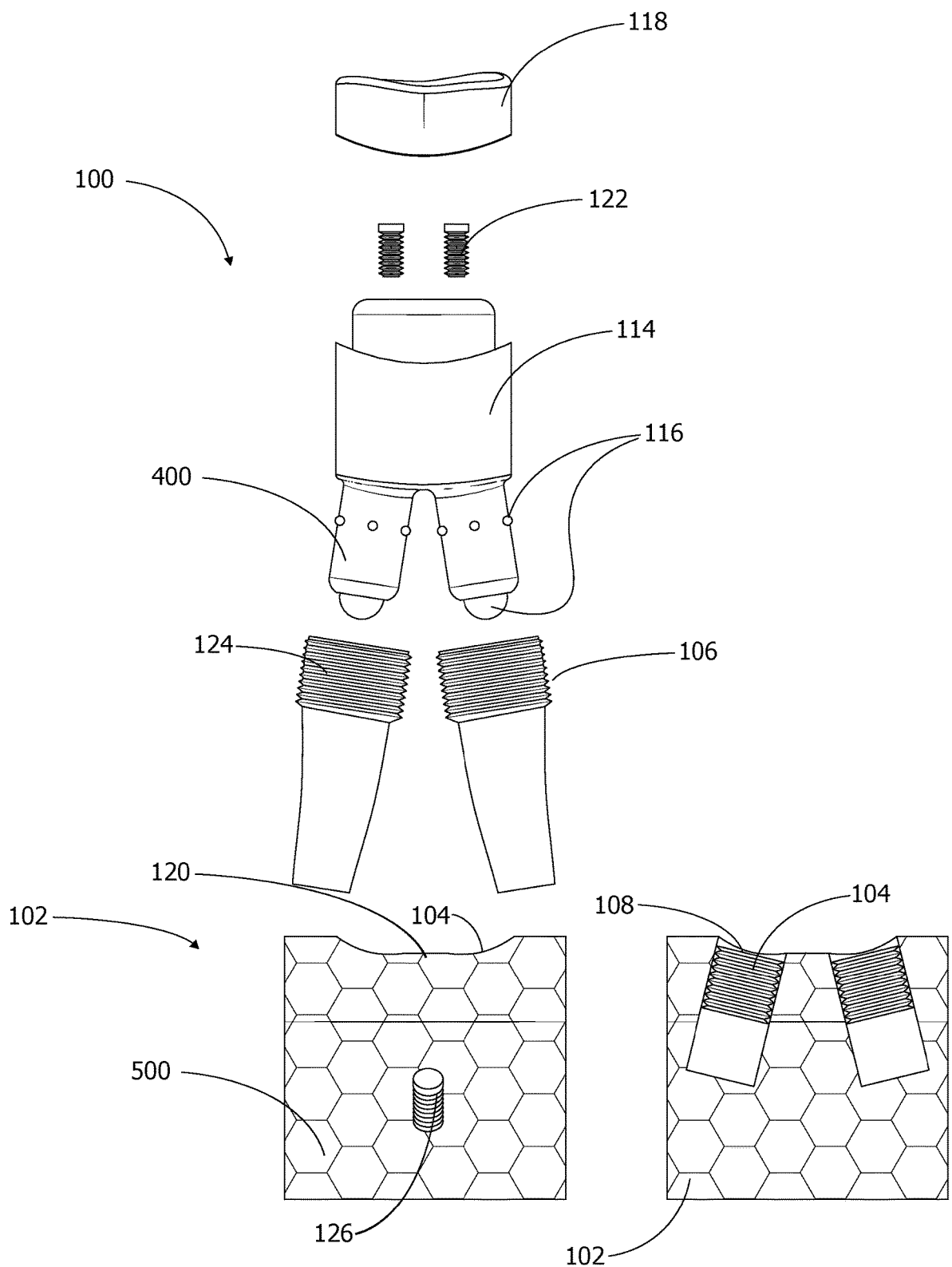
FIG. 5 is a side, exploded view of a dental implant, in accordance with an embodiment of the invention.

FIG. 5 is a side, exploded view of a dental implant, in accordance with an embodiment of the invention. In one embodiment, a device for the replacement of missing bone and inadequate bone level 100 comprises: one or more implant blocks 102, the one or more implant blocks 102 characterized at least partially by a honeycomb-like structure 500 with one or more apertures 104; one or more tooth implants 106, the tooth implants 106 shaped to fit in the one or more apertures 104 of the one or more implant blocks 102, and having one or more apertures 108 in a top surface and having one or more recesses 112 in the one or more apertures 108 in a top surface; one or more tooth abutments 114, the one or more tooth abutments 114 including one or more inclusions 116 placed complementary to the shape of the one or more recesses of the one or more tooth implants 106; and one or more crowns 118, the one or more crowns 118 shaped to fit over the one or more tooth abutments 114. In some embodiments the implant block 102 may be fastened to the bone of a patient by a screw 126 or other securing mechanism.

In one embodiment, a device for the replacement of missing bone and inadequate bone level 100 is comprised of one or more implant blocks 102, shaped to fill in gaps in a human maxilla and a human mandible bones, the one or more implant blocks 102 comprised of an inner and outer layer characterized by a honeycomb-like structure 500, and one or more threaded apertures 104 separated by a raised crest 120; one or more screws 122; one or more tooth implants 106, shaped in a conical form with threading 124 cut to fit in the one or more threaded apertures 104 of the one or more implant blocks 102, and having a threaded internal hole in their top; one or more tooth abutments 114, including one or more members on a side with threading complementary to the threading of the one or more tooth implants 106, and a support structure; and one or more crowns 118, shaped to fit over the support structure of the one or more tooth abutments 114.

In one embodiment the one or more implant blocks 102 may be molded to fit a patient's mouth at the block's creation, or it may be prepared as a block of material and then sculpted to fit the patient's jaw as needed. The one or more implant blocks 102 may be comprised of a variety of materials including but not limited to dental zirconia, titanium, tantalum, PLGA polymer, and/or bone scaffolding, or may be comprised of a composition of different materials or may have individual components each comprised of a different material. The one or more implant blocks 102 may be comprised of materials hereinafter developed suitable for dental implantation purposes.

In one embodiment the one or more implant blocks 102 may be shaped to fit missing spaces in the human jawbone specifically or may be shaped to fit with extra material to allow a puzzle-piece like fit to the location. The one or more implant blocks 102 may be comprised of one or more pieces as necessary to provide a proper fit. The one or more implant blocks 102 may be as small as 2 mm×2 mm×2 mm and as large as 15 cm×15 cm×15 cm. The one or more implant blocks 102 may be comprised of one or more layers, including but not limited to an outer layer of material and an inner layer of material. The inner layer or layers of material may be characterized by a honeycomb-like structure 500 that may be filled in with another material, including but not limited to powdered bone, to facilitate bone reconstruction. In some embodiments, the implant block 102 may separate the one or more apertures 104 with a raised crest 120.

In one embodiment the one or more implant blocks 102 may be further comprised of one or more apertures 104 which may or may not be threaded, the one or more apertures being designed to accommodate a tooth implant 106. In some embodiments the one or more apertures 104 are not threaded and are instead mechanical securing mechanisms complementary to securing mechanisms on a tooth implant 106, such as a hook, latch, flange, or notch that either the block 102 or implant 106 clicks into. The implant 106 and/or implant block 102 may be magnetized if it is comprised of a material capable of being magnetized. The one or more apertures 104 may be characterized by a variety of shapes including but not limited to polygonal, conical, pyramidal or cylindrical. The one or more apertures 104 may also be separated or lie upon a raised crest meant to simulate the ridge of a human jaw.

In one embodiment the honeycomb-like structure 500 is comprised of honeycomb pockets of a uniform shape that may or may not be interconnected with each other and may or may not permeate entirely into the structure. In one embodiment the honeycomb-like structure 500 may be comprised of numerous spheres and partial spheres that may or may not overlap and/or be interconnected with each other. The shape of the pockets comprising the structure within the honeycomb-like structure 500 may vary depending on the needs of the patient. The pockets can range in diameter from 0.1 millimeters to 1.5 centimeters in diameter. In one embodiment the entire implant block 102 is permeated with the honeycomb-like structure 500, while in other embodiments the honeycomb-like structure 500 only permeates a portion of the implant block 102; sometimes only permeating the exterior, or interior of the implant block 102.

In some embodiments, the one or more screws 122 or fastening mechanisms are one or more screws 122, securing the pieces of the device together. In some embodiments the one or more screws 122 are fastening mechanisms including, but not limited to, hinges, latches, hooks, magnets, or pegs. The one or more screws 122 or other fastening mechanisms may be comprised of a variety of materials including but not limited to titanium and may be inserted through the side or top of the one or more implant blocks 102 in order to secure it to existing jaw bone structure if necessary, or additionally may be used to secure components of the dental implant device 100 together. The one or more screws 122 or other fastening mechanisms may be from 1 mm to 10 mm in radius and from 1 mm to 30 mm long.

The one or more tooth implants 106 may be shaped in a variety of forms including but not limited to polygonal, conical, pyramidal or cylindrical in order to fit in the holes of the one or more implant blocks 102. The one or more tooth implants 106 may be anywhere from 1 mm to 15 mm in radius and from 1 mm to 35 mm long. The one or more tooth implants 106 may have one or more exposed internal apertures 108 depending on the shape of the one or more tooth implants 106, designed for holding a tooth abutment 114. The aperture 108 may be characterized by a variety of shapes including but not limited to polygonal, conical, pyramidal or cylindrical. The aperture 108 may be from 1 mm to 10 mm in radius and from 1 mm to 30 mm long. The aperture 108 may include cushioning or support inclusions 116 to support a tooth abutment 114 including but not limited to: ball bearings or springs. The cushioning inclusions 116 can be located at the bottom of the aperture 108, along the sides of the aperture 108, or anywhere else a practitioner deems will allow them to cushion force on the implant itself. The one or more tooth implants 106 may be comprised of a variety of materials including but not limited to dental zirconia, titanium, tantalum, PLGA polymer, and/or bone scaffolding, or may be comprised of a composition of different materials or may have individual components each comprised of a different material. The tooth implant 106 may be threaded on its outside surface or in the aperture 108 in a manner complementary to the threading of the hole of the one or more implant blocks 102 or for a member of a tooth abutment 114 respectively. In some embodiments the material comprising the one or more implant blocks 102 is covered in a substance from a list including but not limited to hydroxyapatite to facilitate bone integration.

The one or more tooth abutments 114 may be shaped in a variety of forms including but not limited to polygonal, conical, pyramidal, oblong, or cylindrical in order to fit in the holes of the one or more tooth implants 106. The one or more tooth abutments 114 may have one or more members 400 shaped to fit the holes of the one or more tooth implants 106. The members 400 may further comprise cushioning inclusions 116 including, but not limited to, ball bearings or springs. The cushioning inclusions 116 may be located on the sides of the abutment members 400 and/or inside a channel they connect to. The cushioning inclusions 116 may be located at the base of the abutments. The members 400 may be threaded complementary to threading on the one or more apertures of the one or more tooth implants 106. The shape of the one or more tooth abutments 114 need not be symmetrical and they may take any shape as needed to fit the patient's need. The one or more tooth abutments 114 may be anywhere from 1 mm×1 mm×1 mm to 30 mm×30 mm×30 mm in dimensions. The one or more tooth abutments 114 may be comprised of a variety of materials, including but not limited to dental zirconia, titanium, tantalum, PLGA polymer, and/or bone scaffolding, or may be comprised of a composition of different materials or may have individual components each comprised of a different material. The one or more tooth abutments 114 may include a support structure capable of supporting one or more crowns 118. The support structure may include a variety of securing mechanisms, including but not limited to, latches, pressure seals, hinges, locks, adhesives, and/or dental cements.

In some embodiments, the one or more tooth abutments 114 are milled from a variety of angles including laterally or longitudinally. In some embodiments, the milling process prevents there from being space between the implant 106 and abutment 114.

The one or more crowns 118 may be shaped in a variety of forms including but not limited to polygonal, conical, pyramidal, oblong, or cylindrical in order to fit in the support structure of the one or more tooth abutments 114. The shape of the one or more crowns 118 need not be symmetrical and they may take any shape as needed to fit the patient's need. The one or more crowns 118 may be anywhere from 1 mm×1 mm×1 mm to 30 mm×30 mm×30 mm in dimensions. The one or more crowns 118 may be comprised of a variety of materials including but not limited to dental zirconia, titanium, tantalum, PLGA polymer, and/or bone scaffolding, or may be comprised of a composition of different materials or may have individual components each comprised of a different material. The one or more crowns 118 may include a variety of securing mechanisms, including but not limited to, latches, pressure seals, hinges, locks, adhesives, and/or dental cements. to secure them to a support structure.

In some embodiments, the tooth implant 106 and tooth abutment 114 are a singular component. In some embodiments, a seal or washer may be placed between the tooth implant 106 and tooth abutment 114, which may provide cushioning when a downward force is placed on the tooth implant 100 device, while also preventing a gap into which food or other damaging particles may intrude. The seal or washer 107 may be comprised of a variety of materials including but not limited to silicone, synthetic rubber, rubber, plastic, or other synthetic or natural materials.

The device may include a means for engaging the one or more tooth abutments 114 into the one or more tooth implants 106. In one embodiment the device is based on a plier design wherein one side of the plier holds the tooth abutment 114 while another utilizes a peg to press down onto an engagement mechanism. The device may alternatively take a variety of forms including but not limited to scissors, pliers, clamps, wrenches, or other tools. The means may also be attached to a handle or other tube device to interact with the one or more tooth abutments 114 or one or more tooth implants 106. In some embodiments the engagement mechanism is a spring-peg mechanism, while in other embodiments may include, but are not limited to, screws, latches, hooks, or other variations of a spring-based system.

In one embodiment, the invention is a method for the replacement of missing bone and inadequate bone level wherein the method is comprised of: preparing an implant block from a block of material by shaping the block to fit a gap in at least one of a human maxilla and human mandible; drilling one or more implant holes on the crest of the implant block; drilling one or more apertures into the side of the implant block 102 to secure the implant block 102 to the at least one of the human maxilla and human mandible; placing the implant block into the gap in at least one of the human maxilla and the human mandible; placing the one or more implant screws into the one or more apertures of the one or more implant blocks 102; using a securing mechanism to secure the implant block 102 to the at least one of a human maxilla and human mandible; placing a filler medium at least one of inside and around the implant block 102 to fill in the honeycomb-like structure 500; placing a membrane over the implant block 102 to contain the medium; placing one or more tooth abutments 114 into the one or more dental implants; and finally placing one or more crowns 118 onto the one or more tooth abutments 114.

Figure 6:
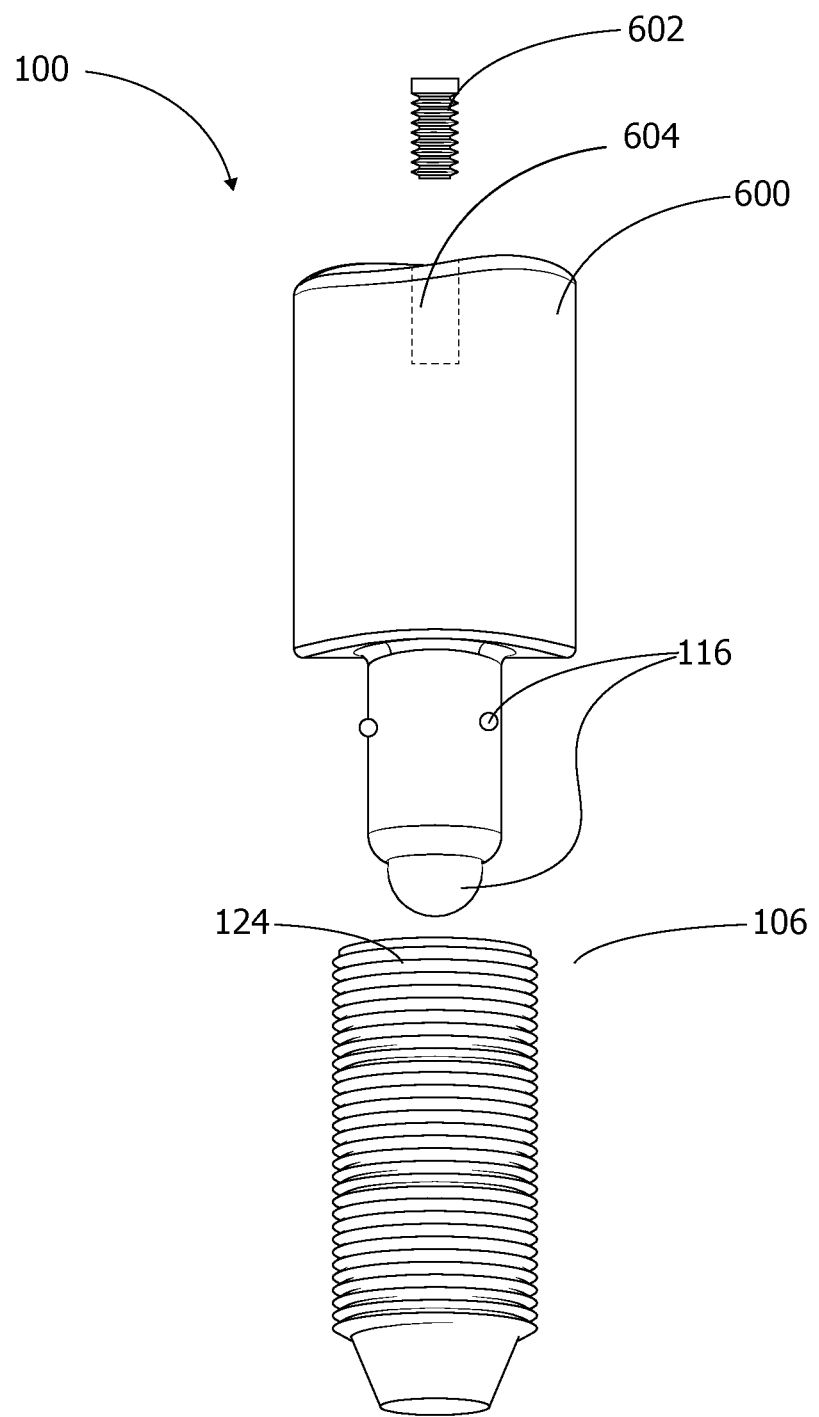
FIG. 6 is a side, exploded view of a dental implant, in accordance with an embodiment of the invention.

FIG. 6 is a side, exploded view of a dental implant, in accordance with an embodiment of the invention. In one embodiment, a device for the replacement of missing bone and inadequate bone level comprises: one or more implant blocks, the one or more implant blocks characterized at least partially by a honeycomb-like structure with one or more apertures; one or more tooth implants 106, the tooth implants 106 shaped to fit in the one or more apertures of the one or more implant blocks, and having one or more apertures in a top surface and having one or more recesses in the one or more apertures in a top surface; one or more tooth abutment-crowns, comprising one or more inclusions 116 on a side with threading complementary to the threading of the one or more tooth implants.

In one embodiment, a device for the replacement of missing bone and inadequate bone level is comprised of one or more implant blocks, shaped to fill in gaps in a human maxilla and a human mandible bones, the one or more implant blocks comprised of an inner and outer layer characterized by a honeycomb-like structure, and one or more threaded holes separated by a raised crest; one or more screws; one or more tooth implants 106, shaped in a conical form with threading 124 cut to fit in the one or more threaded holes of the one or more implant blocks, and having a threaded internal hole in their top; one or more tooth abutment-crowns 600, comprising one or more members on a side with threading complementary to the threading of the one or more tooth implants 106.

In one embodiment the one or more implant blocks may be further comprised of one or more apertures which may or may not be threaded, the one or more apertures being designed to accommodate a tooth implant 106. In some embodiments the one or more apertures are not threaded and are instead mechanical securing mechanisms complementary to securing mechanisms on a tooth implant 106, such as a hook, latch, flange, or notch that either the block or implant 106 clicks into. The implant 106 and/or implant block may be magnetized if it is comprised of a material capable of being magnetized. The one or more apertures may be characterized by a variety of shapes including but not limited to polygonal, conical, pyramidal or cylindrical. The one or more apertures may also be separated or lie upon a raised crest meant to simulate the ridge of a human jaw.

The one or more tooth implants 106 may be shaped in a variety of forms including but not limited to polygonal, conical, pyramidal or cylindrical in order to fit in the holes of the one or more implant blocks. The one or more tooth implants 106 may be anywhere from 1 mm to 15 mm in radius and from 1 mm to 35 mm long. The one or more tooth implants 106 may have one or more exposed internal apertures depending on the shape of the one or more tooth implants 106, designed for holding a one or more tooth abutment-crowns 600. The aperture may be characterized by a variety of shapes including but not limited to polygonal, conical, pyramidal or cylindrical. The aperture may be from 1 mm to 10 mm in radius and from 1 mm to 30 mm long. The aperture may include cushioning or support inclusions 116 to support one or more tooth abutment-crowns 600 including but not limited to: ball bearings or springs. The cushioning inclusions 116 can be located at the bottom of the aperture, along the sides of the aperture, anywhere along the one or more tooth abutment-crowns 600 or anywhere else a practitioner deems will allow them to cushion force on the implant itself. The one or more tooth implants may be comprised of a variety of materials including but not limited to dental zirconia, titanium, tantalum, PLGA polymer, and/or bone scaffolding, or may be comprised of a composition of different materials or may have individual components each comprised of a different material. The tooth implant 106 may be threaded on its outside surface or in the aperture in a manner complementary to the threading of the hole of the one or more implant blocks or for a member of one or more tooth abutment-crowns 600 respectively. In some embodiments the material comprising the one or more implant blocks is covered in a substance from a list including but not limited to hydroxyapatite to facilitate bone integration.

The one or more tooth abutment-crowns 600 may be shaped in a variety of forms including but not limited to polygonal, conical, pyramidal, oblong, or cylindrical in order to fit in the holes of the one or more tooth implants 106. The one or more tooth abutment-crowns 600 may have one or more members shaped to fit the holes of the one or more tooth implants 106. The members may further comprise cushioning inclusions 116 including, but not limited to, ball bearings or springs. The cushioning inclusions 116 may be located on the sides of the abutments and/or inside a channel they connect to. The cushioning inclusions 116 may be located at the base of the abutments. The members may be threaded complementary to threading on the one or more apertures of the one or more tooth implants 106. The shape of the one or more tooth abutment-crowns 600 need not be symmetrical and they may take any shape as needed to fit the patient's need. The one or more tooth abutment-crowns 600 may be anywhere from 1 mm×1 mm×1 mm to 30 mm×30 mm×30 mm in dimensions. The one or more tooth abutment-crowns 600 may be comprised of a variety of materials, including but not limited to dental zirconia, titanium, tantalum, PLGA polymer, and/or bone scaffolding, or may be comprised of a composition of different materials or may have individual components each comprised of a different material.

In some embodiments, the one or more tooth abutment-crowns 600 are milled from a variety of angles including laterally or longitudinally. In some embodiments, the milling process prevents there from being space between the implant 106 and one or more tooth abutment-crowns 600.

The one or more tooth abutment-crowns 600 may be shaped in a variety of forms including but not limited to polygonal, conical, pyramidal, oblong, or cylindrical. The shape of the one or more tooth abutment-crowns 600 need not be symmetrical and they may take any shape as needed to fit the patient's need. In some embodiments, the tooth implant 106 and one or more tooth abutment-crowns 600 are a singular component. In some embodiments, a seal or washer may be placed between the tooth implant 106 and tooth abutment, which may provide cushioning when a downward force is placed on the tooth implant device, while also preventing a gap into which food or other damaging particles may intrude. The seal or washer may be comprised of a variety of materials including but not limited to silicone.

The device may include a means for engaging the one or more tooth abutments and/or one or more tooth abutments-crowns 600 into the one or more tooth implants 106. In one embodiment the device is based on a plier design wherein one side of the plier holds the tooth abutment while another utilizes a peg 602 to press down onto an engagement mechanism 604. The device may alternatively take a variety of forms including but not limited to scissors, pliers, clamps, wrenches, or other tools. The means may also be attached to a handle or other tube device to interact with the one or more tooth abutments or one or more tooth implants 106. In some embodiments the engagement mechanism is a spring-peg mechanism, while in other embodiments may include, but are not limited to, screws, latches, hooks, or other variations of a spring-based system.

Figure 7:
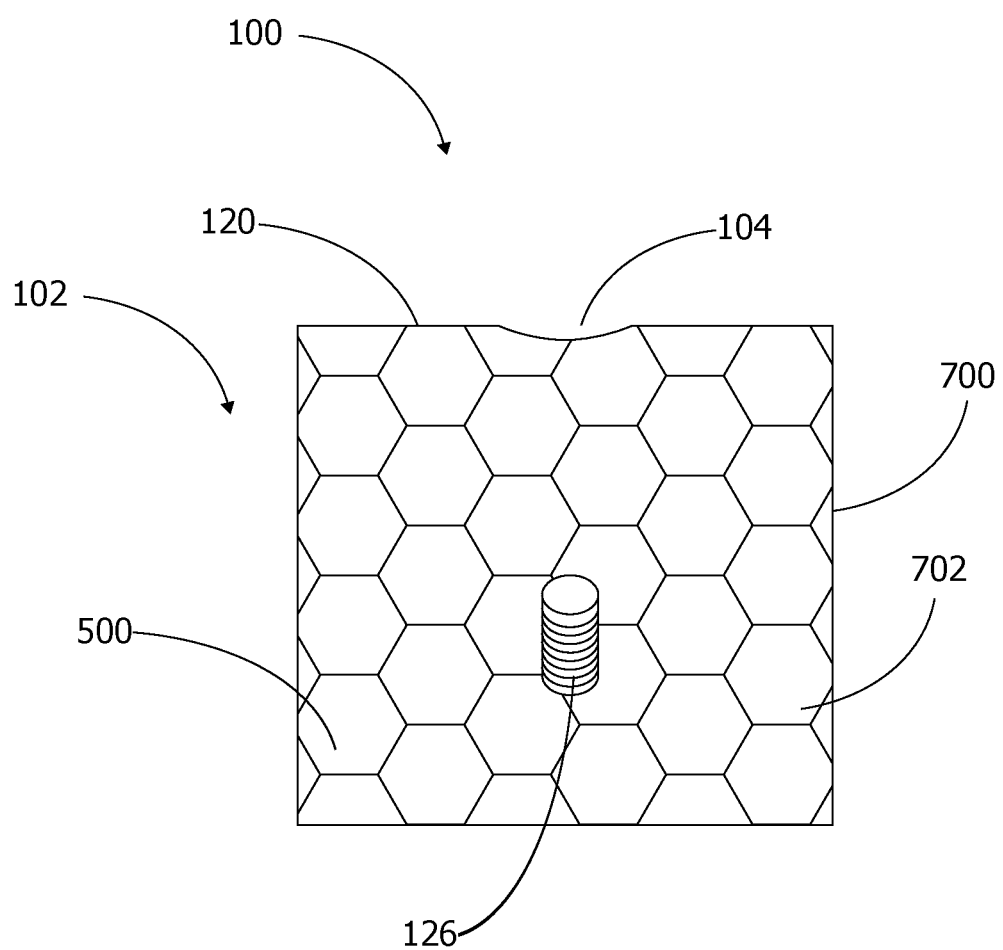
FIG. 7 is a side, view of a dental implant block, in accordance with an embodiment of the invention.

FIG. 7 is a side, exploded view of a dental implant block in a jaw, in accordance with an embodiment of the invention.

In one embodiment, a device for the replacement of missing bone and inadequate bone level is comprised of one or more implant blocks 102, shaped to fill in gaps in a human maxilla and a human mandible bones, the one or more implant blocks 102 comprised of an inner and outer layer characterized by a honeycomb-like structure 500, and one or more threaded apertures 104 separated by a raised crest 120; one or more screws; one or more tooth implants, shaped in a conical form with threading cut to fit in the one or more threaded apertures 104 of the one or more implant blocks 102, and having a threaded internal hole in their top; one or more tooth abutment-crowns, comprising one or more members on a side with threading complementary to the threading of the one or more tooth implants. In some embodiments the implant block 102 may be fastened to the bone of a patient by a screw 126 or other securing mechanism.

In one embodiment the one or more implant blocks 102 may be molded to fit a patient's mouth at the block's creation, or it may be prepared as a block of material and then sculpted to fit the patient's jaw as needed. The one or more implant blocks 102 may be comprised of a variety of materials including but not limited to dental zirconia, titanium, tantalum, PLGA polymer, and/or bone scaffolding, or may be comprised of a composition of different materials or may have individual components each comprised of a different material. The one or more implant blocks 102 may be comprised of materials hereinafter developed suitable for dental implantation purposes.

In one embodiment the one or more implant blocks 102 may be shaped to fit missing spaces in the human jawbone specifically or may be shaped to fit with extra material to allow a puzzle-piece like fit to the location. The one or more implant blocks 102 may be comprised of one or more pieces as necessary to provide a proper fit. The one or more implant blocks 102 may be as small as 2 mm×2 mm×2 mm and as large as 15 cm×15 cm×15 cm. The one or more implant blocks 102 may be comprised of one or more layers, including but not limited to one or more outer layers 700 of material and one or more inner layers 702 of material. The one or more inner layers 702 may be characterized by a honeycomb-like structure 500 that may be filled in with another material, including but not limited to powdered bone, to facilitate bone reconstruction. In some embodiments, the implant block 102 may separate the one or more apertures 104 with a raised crest 120.

In one embodiment the one or more implant blocks 102 may be further comprised of one or more apertures 104 which may or may not be threaded, the one or more apertures being designed to accommodate a tooth implant. In some embodiments the one or more apertures 104 are not threaded and are instead mechanical securing mechanisms complementary to securing mechanisms on a tooth implant, such as a hook, latch, flange, or notch that either the block 102 or implant clicks into. The implant and/or implant block 102 may be magnetized if it is comprised of a material capable of being magnetized. The one or more apertures 104 may be characterized by a variety of shapes including but not limited to polygonal, conical, pyramidal or cylindrical. The one or more apertures 104 may also be separated or lie upon a raised crest meant to simulate the ridge of a human jaw.

In one embodiment the honeycomb-like structure 500 is comprised of honeycomb pockets of a uniform shape that may or may not be interconnected with each other and may or may not permeate entirely into the structure. In one embodiment the honeycomb-like 500 structure may be comprised of numerous spheres and partial spheres that may or may not overlap and/or be interconnected with each other. The shape of the pockets comprising the structure within the honeycomb-like structure 500 may vary depending on the needs of the patient. The pockets can range in diameter from 0.1 millimeters to 1.5 centimeters in diameter. In one embodiment the entire implant block 102 is permeated with the honeycomb-like structure 500, while in other embodiments the honeycomb-like structure 500 only permeates a portion of the implant block 102; sometimes only permeating the exterior, or interior of the implant block 102.

Figure 8:
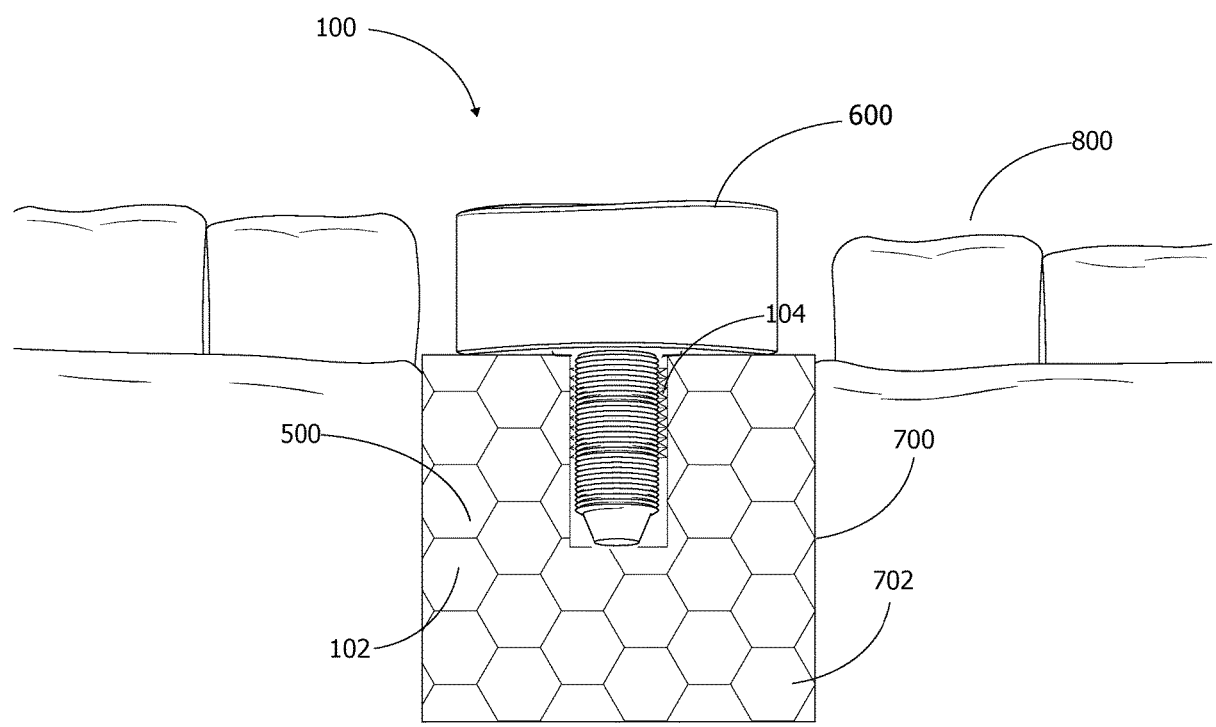
FIG. 8 is a side, cutaway view of a dental implant block in a patient's jaw, in accordance with an embodiment of the invention.

FIG. 8 is a side, cutaway view of a dental implant block in a patient's jaw, in accordance with an embodiment of the invention.

In one embodiment, a device for the replacement of missing bone and inadequate bone level is comprised of one or more implant blocks 102, shaped to fill in gaps in a human maxilla and a human mandible bones 800, the one or more implant blocks 102 comprised of an inner and outer layer characterized by a honeycomb-like structure 500, and one or more threaded apertures 104 separated by a raised crest; one or more screws; one or more tooth implants, shaped in a conical form with threading cut to fit in the one or more threaded apertures 104 of the one or more implant blocks 102, and having a threaded internal hole in their top; one or more tooth abutment-crowns, comprising one or more members on a side with threading complementary to the threading of the one or more tooth implants. In some embodiments the implant block 102 may be fastened to the bone of a patient by a screw or other securing mechanism.

In one embodiment the one or more implant blocks 102 may be molded to fit a patient's mouth at the block's creation, or it may be prepared as a block of material and then sculpted to fit the patient's jaw 800 as needed. The one or more implant blocks 102 may be comprised of a variety of materials including but not limited to dental zirconia, titanium, tantalum, PLGA polymer, and/or bone scaffolding, or may be comprised of a composition of different materials or may have individual components each comprised of a different material. The one or more implant blocks 102 may be comprised of materials hereinafter developed suitable for dental implantation purposes.

In one embodiment the one or more implant blocks 102 may be shaped to fit missing spaces in the human jawbone 800 specifically or may be shaped to fit with extra material to allow a puzzle-piece like fit to the location. The one or more implant blocks 102 may be comprised of one or more pieces as necessary to provide a proper fit. The one or more implant blocks 102 may be as small as 2 mm×2 mm×2 mm and as large as 15 cm×15 cm×15 cm. The one or more implant blocks 102 may be comprised of one or more layers, including but not limited to one or more outer layers 700 of material and one or more inner layers 702 of material. The inner layer or layers of material may be characterized by a honeycomb-like structure 500 that may be filled in with another material, including but not limited to powdered bone, to facilitate bone reconstruction. In some embodiments, the implant block 102 may separate the one or more apertures 104 with a raised crest.

In one embodiment the one or more implant blocks 102 may be further comprised of one or more apertures 104 which may or may not be threaded, the one or more apertures being designed to accommodate a tooth implant. In some embodiments the one or more apertures 104 are not threaded and are instead mechanical securing mechanisms complementary to securing mechanisms on a tooth implant 106, such as a hook, latch, flange, or notch that either the block 102 or implant clicks into. The implant and/or implant block 102 may be magnetized if it is comprised of a material capable of being magnetized. The one or more apertures 104 may be characterized by a variety of shapes including but not limited to polygonal, conical, pyramidal or cylindrical. The one or more apertures 104 may also be separated or lie upon a raised crest meant to simulate the ridge of a human jaw 800.

In one embodiment the honeycomb-like structure 500 is comprised of honeycomb pockets of a uniform shape that may or may not be interconnected with each other and may or may not permeate entirely into the structure. In one embodiment the honeycomb-like structure 500 may be comprised of numerous spheres and partial spheres that may or may not overlap and/or be interconnected with each other. The shape of the pockets comprising the structure within the honeycomb-like structure 500 may vary depending on the needs of the patient. The pockets can range in diameter from 0.1 millimeters to 1.5 centimeters in diameter. In one embodiment the entire implant block 102 is permeated with the honeycomb-like structure 500, while in other embodiments the honeycomb-like structure 500 only permeates a portion of the implant block 102; sometimes only permeating the exterior, or interior of the implant block 102.

Figure 9:
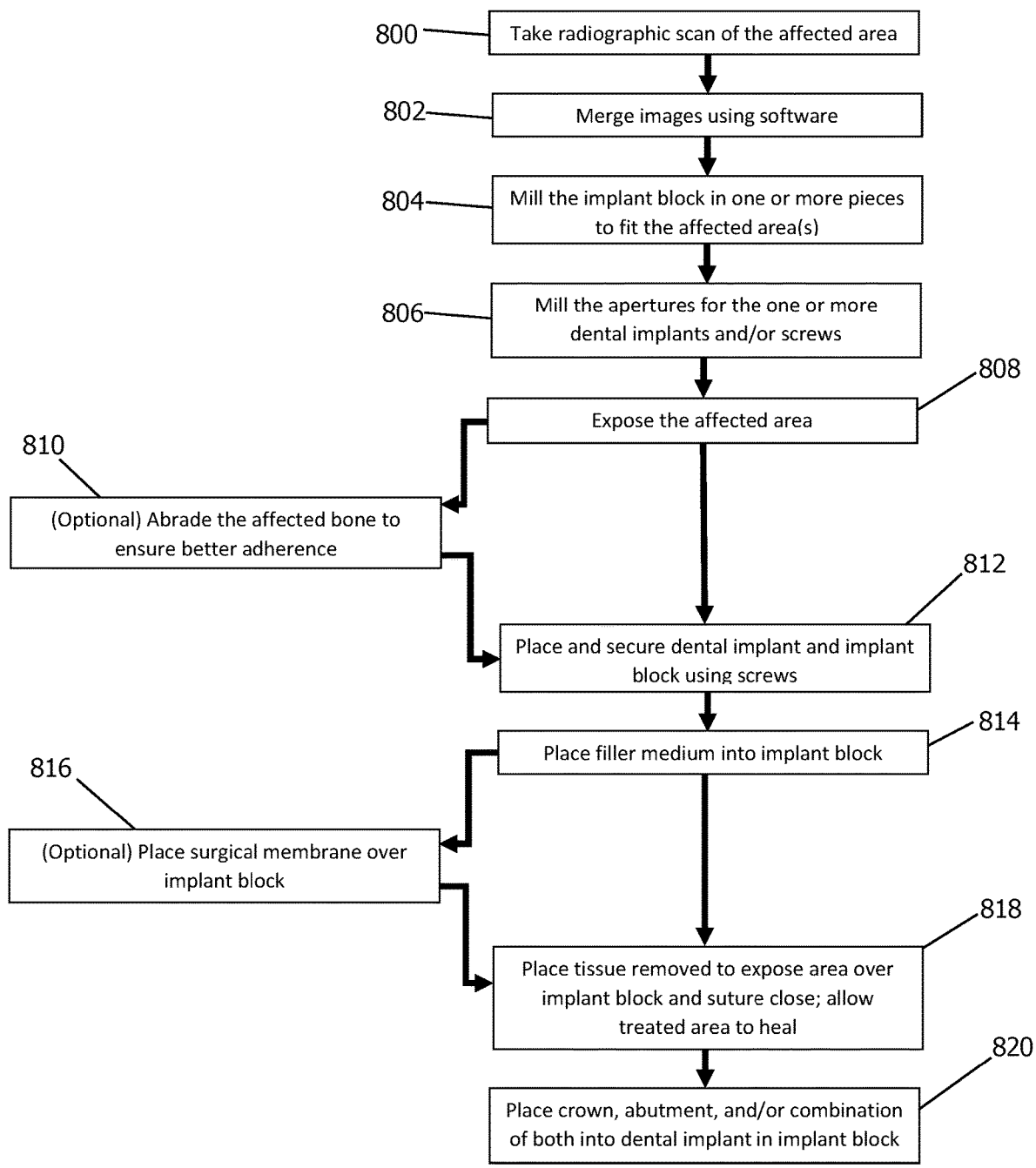
FIG. 9 is a diagram demonstrating the method for preparing and implanting a dental implant, in accordance with an embodiment of the invention.

FIG. 9 is a diagram demonstrating the method for preparing and implanting a dental implant. In one embodiment, a method for the replacement of missing bone and inadequate bone level comprises, but is not limited to: taking a radiographic scan of the affected area, usually the upper and lower jaw, to measure the precise measurements of the affected bone area along with any unique features to that jaw 900; the image may be merged with a software program such as, but not limited to, CEREC 902; milling implant block in one or more pieces to fit over the patient's jaw where bone and/or tooth material may be missing or damaged 904; milling holes for the one or more dental implants and/or one or more screws or other fastening mechanisms with which to attach the implant block to the natural bone 906; having a practitioner open the patient's gums and separate them from the bone thus forming a flap that exposes the jaw bone 908; the bone may be prepared by abrading it and/or scoring an area around the damaged or missing bone area to ensure that the implant block will sit flush with the surrounding bone to enable an even transition from implant block to natural bone without bulky protuberances 910; place the implant block and dental implant and secure them to the jaw bone through screws, in some embodiments the dental implant pierces the entirety of the implant block and into the jaw itself so that natural bone can grow around it 912; powdered bone or another dental suitable substance is placed over the implant block to cover it and fill any honeycomb spaces as a filler medium to improve bone growth 914; a surgical membrane may or may not be placed over the implant block to prevent the powdered bone from coming out and/or to prevent tissue from growing into the honeycomb spaces 916; the gingival tissue is stretched and placed over the implant block and device where it is sutured and the area is left to heal for a time period depending on the size of treated area and health of the patient 918; an abutment is fitted to the dental implant in the implant block, and a crown may be placed over the implant or the abutment and crown may be a single piece that is placed over the implant 920.

In some embodiments the radiographic scan is accomplished through x-ray or other spectrographic means other than radio waves. In some embodiments, ultrasound and/or other techniques for imaging can support the scan to provide more accurate information.

In some embodiments the tooth abutment and/or crown are milled as a single piece, or may be milled as separate pieces to allow for crown removal and/or replacement. In some embodiments the milling machine must be modified in order to mill the tooth abutment and/or crown from a "head on" angle or from a side or alternative angle including but not limited to laterally.

In some embodiments, the implant block is milled in a single piece, while in others it is milled from multiple pieces that are later combined. The implant block may be milled from any angle depending on the needs of the patient.

In some embodiments steps of the above method may be combined or omitted depending on the exact nature of the patient's dental needs; in certain embodiments some steps may need to take place with additional steps between them in order to ensure proper usage. In some embodiments the implant block is shaped like a saddle to encompass existing bone and supplement it, while in other embodiments it may function as a bridge between two areas of bone that have lost connection due to injury or decay. In some embodiments the implant block is milled with one or more holes for dental implants and one or more holes for a screw or other mechanism to be used to fasten the implant block to a jawbone.

In some embodiments, a practitioner opens the patients gums or other tissue that may be concealing the affected area by creating a flap or other area of excess tissue that can later be placed over the implant block while exposing the bone in the short term. In some embodiments, after the area is allowed to heal the flap may be placed over the one or more dental implants and implant block in order to allow natural bone to grow into them.

In some embodiments, a practitioner can prepare bone near the affected area by abrading or otherwise scoring it in order to allow for a better fit due to frictional forces. In some embodiments, some amount of bone may be removed in order to allow a flush fit between the implant block and the bone remaining outside of the affected area.

In some embodiments, the implant block has one or more dental implants inserted into it which can then be secured by one or more screws or other fastening mechanisms; the implant block itself may also be secured to the bone by one or more screws or other fastening mechanisms which may or may not also pierce the one or more dental implants. In some embodiments the one or more dental implants and implant block may partially piece the natural bone so that natural bone can grow over them.

In some embodiments, powdered bone or another suitable dental substrate may be inserted into the implant block in order to facilitate regrowth. In some embodiments a surgical membrane may over the entire implant block in order to protect the area and further facilitate bone growth.

In some embodiments, one or more tooth abutments and/or one or more crowns are inserted into the one or more dental implants. In some embodiments the one or more tooth abutments and one or more crowns are a combined element and may be milled as a single piece. In some embodiments there may be one or more ball bearings or another form of cushioning mechanism placed inside the dental implant between it and the one or more tooth abutments or one or more tooth abutment-crown combinations in order to cushion them. In some embodiments these cushioning inclusions 116 may be springs, metallic cylinders, softer metals, or other means of providing resistance but allowing flexibility.

Accordingly, the scope of the invention is not limited by the disclosure of these preferred and alternate embodiments. Instead, the invention should be determined by reference to the claims that follow.

What is claimed is:

1. A device for the replacement of missing bone and inadequate bone level, the device comprising:
    one or more implant blocks, the one or more implant blocks characterized at least partially by a porous structure and comprising one or more apertures, wherein a particulate bone substitute is added to the porous structure of the one or more implant blocks and a membrane is placed over the one or more implant blocks to contain the particulate bone substitute inside the one or more implant blocks wherein the one or more implant blocks is shaped based on scans of a patients jaw;
    one or more tooth implants, the one or more tooth implants shaped to substantially fit in the one or more apertures of the one or more implant blocks, and having one or more recesses on a top surface of the one or more tooth implants and the one or more recesses have one or more depressions in an inner wall and a depression on a bottom wall of the one or more tooth implants; and
    one or more tooth abutment-crowns, the one or more tooth abutment-crowns comprising one or more members positioned complementary to the one or more recesses of the one or more tooth implants and shaped to substantially fit therein such that there is no gap between the one or more tooth implants and the one or more tooth abutment-crowns, and having one or more indentations located on an outer surface of the one or more members corresponding to the one or more depressions of the inner wall of the one or more tooth implants and an indentation located on a bottom end of an outer surface of the one or more members corresponding to the depression on the bottom wall of the one or more tooth implants, and said outer surface has one or more ball bearings located at least partially inside the one or more indentations of the outer surface and wherein each of the one or more ball bearings are positioned in a cavity between one of the one or more depressions and one of the one or more indentations and the cavity is slightly larger than the one or more ball bearings and a bottom ball bearing is positioned within a second cavity formed between the indentation located on a bottom end of an outer surface of the one or more members and the depression on the bottom wall of the one or more tooth implants wherein the second cavity is slightly larger than the bottom ball bearing wherein the bottom ball bearing and one or more ball bearings are configured to absorb pressure from any direction, wherein a top surface of the one or more tooth abutment-crowns is positioned and shaped to emulate the crown of a natural tooth, and the tooth abutment-crowns are a single structure created as a monolith from a single piece of material.

2. The device of claim 1, wherein the one or more tooth abutment-crowns further comprise:
    a mechanism to engage or disengage the one or more abutment-crowns from the one or more recesses of the one or more tooth implants, wherein the mechanism is comprised of a peg that engages the tooth abutment-crown to the implant when pressed down into a locked position and disengaged the tooth abutment-crown when pressed a second tune into an unlocked position.

3. The device of claim 2, wherein the device further comprises:
    a detachment mechanism used to engage the mechanism to engage or disengage the one or more abutment-crowns from the one or more recesses of the one or more tooth implants, wherein the disengagement mechanism is a hinged tool with a grasping end configured to grasp the tooth abutment-crown and when actuated a second disengagement end presses down on the peg of the mechanism of the tooth abutment-crown.

4. The device of claim 1, wherein the one or more implant blocks are substantially comprised of dental zirconia.

5. The device of claim 1, wherein the one or more implant blocks are substantially comprised of titanium.

6. The device of claim 1, wherein the one or more implant blocks and the one or more tooth implants corresponding to the one or more apertures of the one or more implant blocks are treated with at least one of hydroxyapatite and nano-hydroxyapatite.

7. The device of claim 3, wherein the one or more apertures of the one or more implant blocks are threaded.

8. The device of claim 7, wherein an outer surface of the one or more tooth implants are at least partially threaded complementary to the threading of the one or more implant blocks.

9. The device of claim 8, wherein the one or more members of the one or more tooth abutment-crowns is threaded complementary to the threading of the one or more internal holes of the one or more tooth implants.

10. The device of claim 1, wherein the one or more tooth abutment-crowns further comprises: a mechanism for absorbing variable amounts of pressure.

11. The device of claim 10, wherein the mechanism for absorbing variable amounts of pressure is one or more springs located in the one or more members.

12. The device of claim 3, wherein the one or more implant blocks are substantially shaped to approximate a missing section of a patient's jaw and wherein a top of the one or more implant blocks is substantially level with the patient's jaw.

13. A method for the replacement of missing bone and inadequate bone level, the method comprising:
preparing an implant block from a block of a material by shaping the block to fit a gap in at least one of a bone wherein the shape of the block is at least partially based off of scan data of a patient's jaw and the implant block substantially conforms to the shape of the gap such that an upper edge of the implant block is approximately equal in level with the patient's jaw;
boring one or more implant block holes into the implant block;
boring one or more apertures into the implant block and inserting one or more dental implants which are further comprised of at least an indentation to receive a cushioning ball bearing;
placing the implant block into the gap in a bone;
placing one or more implant screws into the one or more implant block holes:
using a securing mechanism to secure the implant block to the bone;
filling the implant block with a particulate filler medium to fill in the honeycomb structure; and placing a membrane over the implant block to contain the filler medium;
preparing one or more tooth abutment-crowns where each comprises a shaft, at least one cushioning ball bearing on a bottom surface of each of the one or more tooth abutment-crowns and at least one cushioning ball bearing on a side surface of each of the one or more tooth abutment-crowns, and a crown and each is created as a monolith from a single piece of material wherein the one or more tooth abutment crowns has at least one indentation on the shaft substantially shaped to receive a portion of the cushioning ball bearing;
placing the one or more tooth abutment-crowns into the one or more dental implants such that each tooth abutment-crown is located. in substantially the position a natural tooth crown would be and the cushioning ball bearings are movably embedded into indentations inside the implant block corresponding to the location of the cushioning ball bearings on the one or more tooth abutment-crowns.

14. A device for the replacement of missing bone and inadequate bone level, the device comprising:
one or more implant blocks, shaped to fill in gaps in a jaw bone, the one or more implant blocks being substantially shaped to approximate a missing section of a patient's jaw based on scans of the patient's jaw and wherein a top of the one or more implant blocks is substantially level with the patient's jaw and the one or more implant blocks are comprised of at least one of an inner layer and an outer layer of material characterized by a honeycomb-like structure, and one or more apertures separated by a raised crest wherein a particulate bone substitute is added inside and outside the honeycomb-like structure of the one or more implant blocks to supplement bone growth without blocking or filling the one or more apertures and a membrane is placed over the one or more implant blocks to contain the particulate bone substitute within the honeycomb-like structure:
one or more screws;
one or more tooth implants, the tooth implants shaped in a conical form with cut to fit in the one or more apertures of the one or more implant blocks, and having one or more internal holes in their base and one or more recesses on an inner wall of the one or more internal holes;
one or more tooth abutment-crowns, the one or more tooth abutment-crowns comprising one or more members on a side complementary to the shape of the one or more internal holes of the one or more tooth implants such that there is no gap between the one or more tooth implants and the one or more tooth abutment-crowns, wherein a top surface of the one or more members is shaped and positioned as a crown of a natural tooth, and one or more ball bearings removably coupled into one or more recesses on an outer surface of the one or more tooth abutment-crowns complementary to the one or more recesses on the inner wall of the one or more internal holes of the one or more tooth implants, and the tooth abutment-crowns are a single structure created as a monolith from a single piece of material and are substantially shaped to fit the space and shape of one or more missing natural teeth.

\* \* \* \* \*